United States Patent
Erb et al.

(10) Patent No.: US 9,772,036 B2
(45) Date of Patent: Sep. 26, 2017

(54) SELF-ADJUSTING ROTARY WHEEL SEALING SYSTEM WITH FOAM MOUNT

(71) Applicant: Nortek Air Solutions Canada, Inc., Saskatoon (CA)

(72) Inventors: Blake Norman Erb, Warman (CA); Manfred Gerber, Saskatoon (CA); Maury Brad Wawryk, Saskatoon (CA); David Martin Wintemute, Trois-Rivieres (CA); Paul Lorenzo Pieper, D.D.O. (CA)

(73) Assignee: Nortek Air Solutions Canada, Inc., Saskatoon (CA)

( * ) Notice: Subject to any disclaimer, the term of this patent is extended or adjusted under 35 U.S.C. 154(b) by 1229 days.

(21) Appl. No.: 13/650,241

(22) Filed: Oct. 12, 2012

(65) Prior Publication Data
US 2013/0140777 A1    Jun. 6, 2013

Related U.S. Application Data

(63) Continuation-in-part of application No. 13/311,052, filed on Dec. 5, 2011.

(51) Int. Cl.
*F23L 15/02* (2006.01)
*F16J 15/3224* (2016.01)
*F16J 15/3288* (2016.01)

(52) U.S. Cl.
CPC ....... *F16J 15/3224* (2013.01); *F16J 15/3288* (2013.01)

(58) Field of Classification Search
CPC ... F28D 19/047; F24F 3/1423; F24F 2203/10; F24F 2203/1096; Y01T 137/0318; Y01T 137/8593; B01D 53/265; F16J 15/3224; F16J 15/3288
USPC ........................................ 165/8, 9
See application file for complete search history.

(56) References Cited

U.S. PATENT DOCUMENTS

| | | | |
|---|---|---|---|
| 3,262,707 A | 7/1966 | Williams | |
| 3,601,414 A * | 8/1971 | Rao | F28D 19/047 165/9 |
| 3,703,206 A | 11/1972 | Barnard | |
| 3,845,545 A | 11/1974 | Surrall et al. | |
| 3,882,927 A | 5/1975 | Penny | |

(Continued)

FOREIGN PATENT DOCUMENTS

| WO | WO 8808112 | 10/1988 |
|---|---|---|
| WO | WO-2013/082692 A1 | 6/2013 |

OTHER PUBLICATIONS

U.S. Appl. No. 13/311,052, filed Dec. 5, 2011, Rotary Wheel Sealing System.

(Continued)

*Primary Examiner* — Travis Ruby
(74) *Attorney, Agent, or Firm* — Schwegman Lundberg & Woessner, P.A.

(57) ABSTRACT

A rotary wheel assembly is configured for use with a system for conditioning air to be supplied to an enclosed structure. The rotary wheel is configured to be positioned within a supply air stream and an exhaust air stream. The assembly includes a cassette frame, a wheel rotatably secured within the cassette frame, and a self-adjusting seal subassembly configured to maintain sealing engagement with respect to a surface of the wheel. The self-adjusting seal subassembly includes at least one seal member.

20 Claims, 16 Drawing Sheets

(56) References Cited

U.S. PATENT DOCUMENTS

| | | | | |
|---|---|---|---|---|
| 3,899,182 A | * | 8/1975 | Johnson | F28D 19/047 106/286.2 |
| 3,907,310 A | | 9/1975 | Dufour | |
| 3,931,852 A | * | 1/1976 | Rao | F28D 19/047 165/9 |
| 3,938,813 A | * | 2/1976 | Forch | F16J 15/3228 277/556 |
| 3,939,903 A | | 2/1976 | Sakaki et al. | |
| 3,977,465 A | * | 8/1976 | Tank | F28D 19/047 165/9 |
| 4,214,930 A | * | 7/1980 | Burrous | E06B 7/22 156/1 |
| 4,399,863 A | | 8/1983 | Banasiuk | |
| 5,063,993 A | | 11/1991 | Huston | |
| 6,361,585 B1 | * | 3/2002 | Anzai | B01D 53/06 95/113 |
| 6,789,605 B1 | | 9/2004 | Kaser | |
| 7,413,194 B2 | | 8/2008 | Wright | |
| 7,458,228 B2 | | 12/2008 | Lagace | |
| 2008/0100003 A1 | * | 5/2008 | Vance | F16J 15/3288 277/553 |
| 2009/0320441 A1 | | 12/2009 | Selder | |
| 2010/0200068 A1 | | 8/2010 | D'Arcy | |
| 2011/0308265 A1 | | 12/2011 | Phannavong | |
| 2013/0139890 A1 | | 6/2013 | Erb et al. | |

OTHER PUBLICATIONS

International Search Report for counterpart PCT/CA2012/000973, mailed Jan. 31, 2013.
AAONAIRE Energy Recovery Units Users Information Manual.
"U.S. Appl. No. 13/311,052, Non Final Office Action mailed Feb. 12, 2015", 12 pgs.
"U.S. Appl. No. 13/311,052, Response filed May 7, 2015 to Non Final Office Action mailed Feb. 12, 2015", 13 pgs.
"U.S. Appl. No. 13/311,052, Response filed Oct. 20, 2014 to Restriction Requirement mailed Jun. 20, 2014", 15 pgs.
"U.S. Appl. No. 13/311,052, Restriction Requirement mailed Jun. 20, 2014", 6 pgs.
"International Application Serial No. PCT/CA2012/000973, International Preliminary Report on Patentability mailed Jun. 19, 2014", 6 pgs.
"International Application Serial No. PCT/CA2012/000973, Written Opinion mailed Jan. 31, 2013", 4 pgs.
"U.S. Appl. No. 13/311,052, Non Final Office Action mailed Jan. 7, 2016", 14 pgs.
"U.S. Appl. No. 13/311,052, Advisory Action mailed Oct. 8, 2015", 3 pgs.
"U.S. Appl. No. 13/311,052, Final Office Action mailed Jul. 22, 2015", 15 pgs.
"U.S. Appl. No. 13/311,052, Response filed Sep. 22, 2015 to Final Office Aciton mailed Jul. 22, 2015", 16 pgs.
"U.S. Appl. No. 13/311,052, Final Office Action mailed Jun. 21, 2016", 14 pgs.
"U.S. Appl. No. 13/311,052, Response filed May 6, 2016 to Non Final Office Action mailed Jan. 7, 2016", 15 pgs.
"U.S. Appl. No. 13/311,052, Advisory Action mailed Sep. 16, 2016", 6 pgs.
"U.S. Appl. No. 13/311,052, Non Final Office Action mailed Oct. 6, 2016", 12 pgs.
"U.S. Appl. No. 13/311,052, Response filed Aug. 22, 2016 to Final Office Action mailed Jun. 21, 2016", 14 pgs.
"U.S. Appl. No. 13/311,052, Final Office Action mailed Mar. 1, 2017", 13 pgs.
"U.S. Appl. No. 13/311,052, Response filed Jan. 6, 2017 to Non Final Office Action mailed Oct. 6, 2016", 13 pgs.
"U.S. Appl. No. 13/311,052, Advisory Action dated Jun. 14, 2017", 3 pgs.
"U.S. Appl. No. 13/311,052, Ex Parte Quayle Action mailed Jun. 28, 2017", 6 pgs.
"U.S. Appl. No. 13/311,052, Response filed Jun. 1, 2017 to Final Office Action dated Mar. 1, 2017", 13 pgs.

* cited by examiner

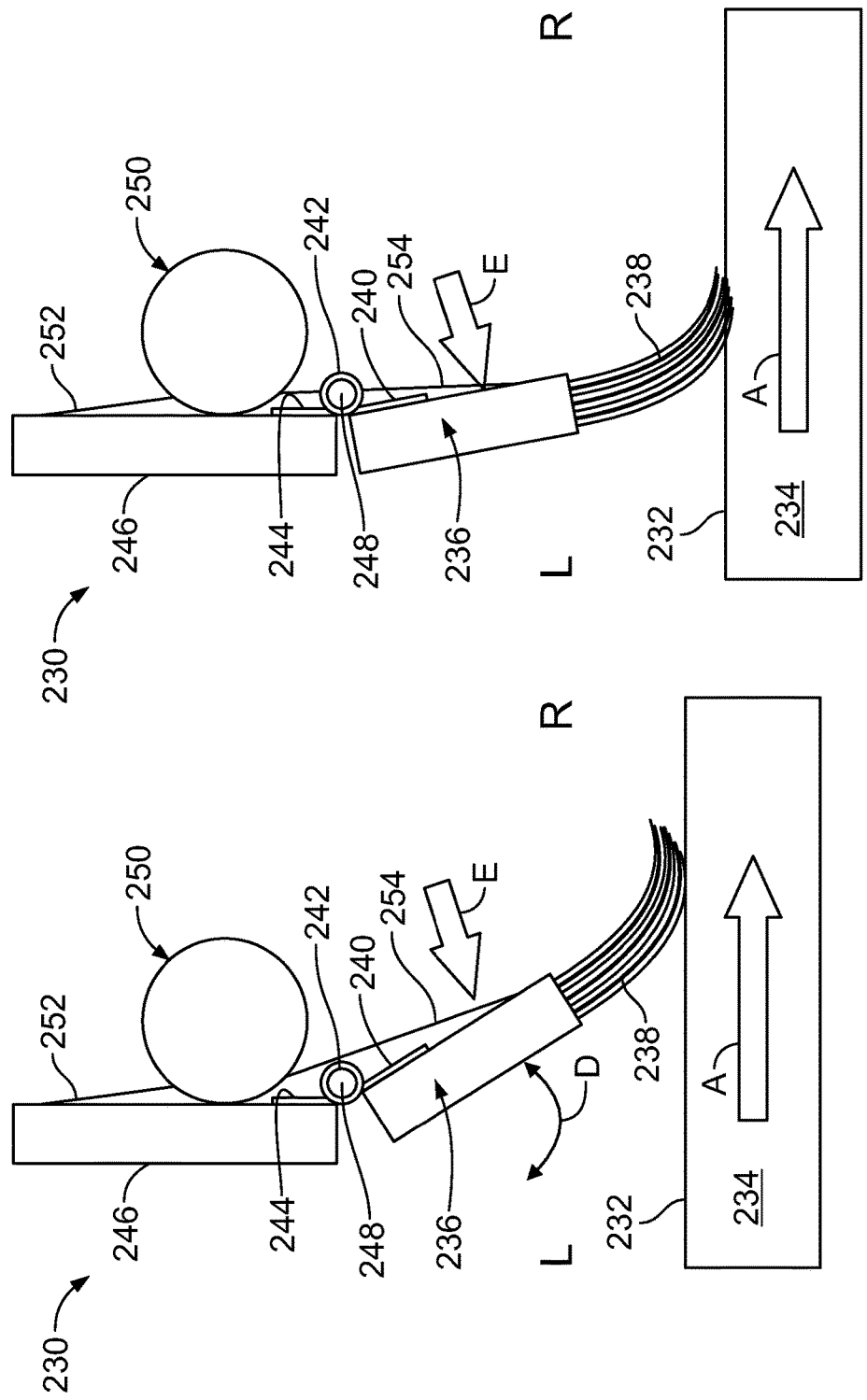

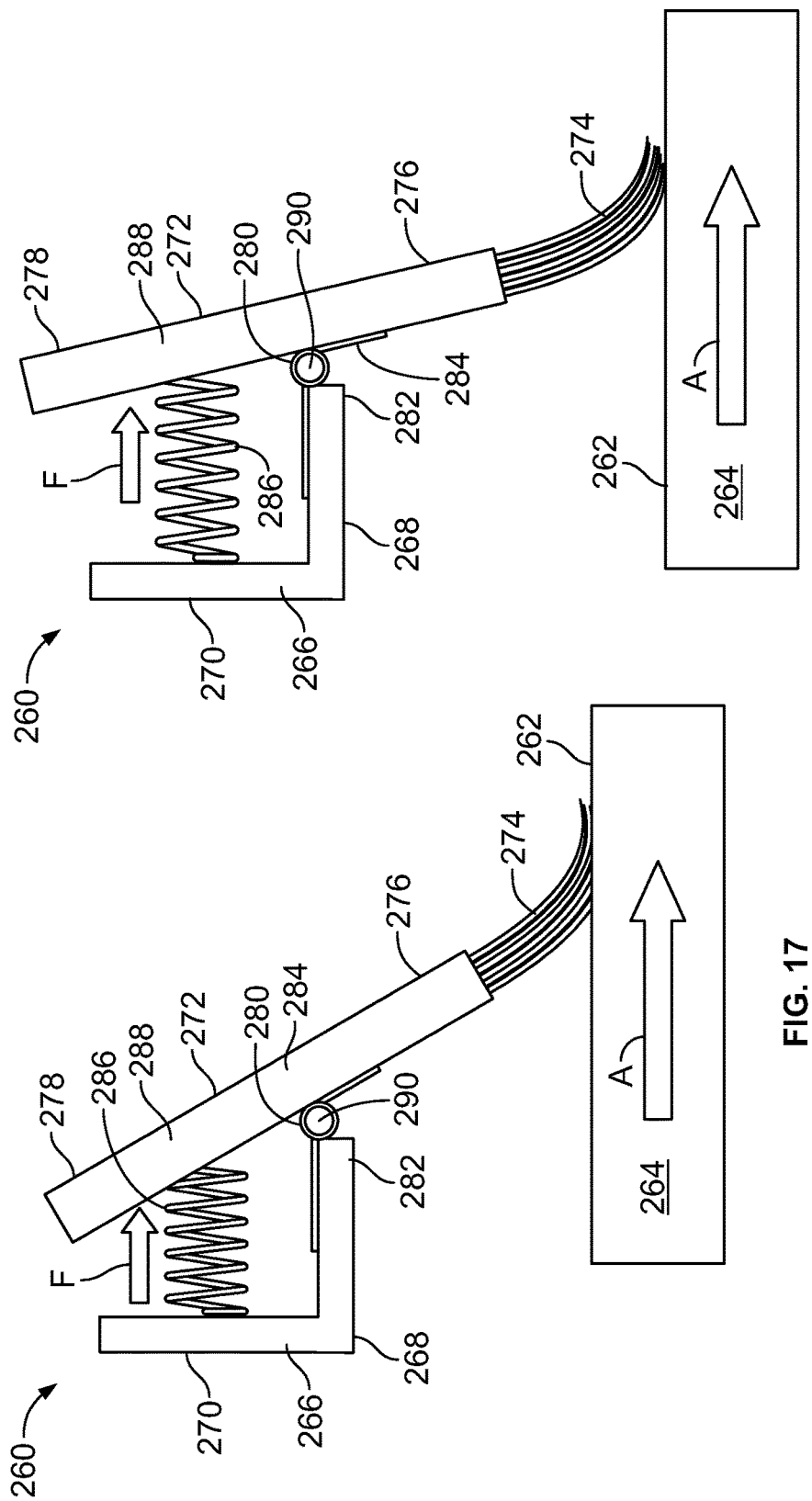

SELF-ADJUSTING ROTARY WHEEL SEALING SYSTEM WITH FOAM MOUNT

CROSS REFERENCE TO RELATED APPLICATIONS

The present application is a continuation-in-part of U.S. patent application Ser. No. 13/311,052 filed Dec. 5, 2011, entitled "Rotary Wheel Sealing System," which is hereby expressly incorporated by reference in its entirety.

BACKGROUND OF THE INVENTION

Embodiments relate generally to a system and method for sealing a rotary wheel used in HVAC applications, and, more particularly, to a self-adjusting sealing system and method for a rotary wheel used in HVAC applications.

Enclosed structures, such as occupied buildings, factories and animal barns, generally include an HVAC system for conditioning ventilated and/or recirculated air in the structure. The HVAC system includes a supply air flow path and a return and/or exhaust air flow path. The supply air flow path receives air, for example outside or ambient air, recirculated air, or outside or ambient air mixed with recirculated air, and channels and distributes the air into the enclosed structure. The air is conditioned by the HVAC system to provide a desired temperature and humidity of supply air discharged into the enclosed structure. The exhaust air flow path discharges air back to the environment outside the structure, or ambient air conditions outside the structure. Without energy recovery, conditioning the supply air typically requires a significant amount of auxiliary energy. This is especially true in environments having extreme outside air conditions that are much different than the required supply air temperature and humidity. Accordingly, energy exchange or recovery systems are typically used to recover energy from the exhaust air flow path. Energy recovered from air in the exhaust flow path is utilized to reduce the energy required to condition the supply air.

Conventional energy exchange systems may utilize energy recovery devices (for example, energy wheels and permeable plate exchangers) or heat exchange devices (for example, heat wheels, plate exchangers, heat-pipe exchangers and run-around heat exchangers) positioned in both the supply air flow path and the exhaust air flow path. A Dedicated Outdoor Air System (DOAS) conditions ambient air to desired supply air conditions through a combination of heating, cooling, dehumidification, and/or humidification.

Rotary wheels represent one type of energy recovery device. A rotary wheel may also be referred to as a rotor, thermal wheel, rotary heat exchanger, enthalpy wheel, heat recovery wheel, desiccant wheel, or the like. In general, a rotary wheel includes a matrix of heat-absorbing or heat/moisture-absorbing material. The wheel is slowly rotated within supply and exhaust streams of an air handling system. During a winter mode of operation, as the rotary wheel rotates, heat and/or moisture is picked up from the exhaust stream in one half of the rotation, and transferred to the supply stream in the other half of rotation. Waste energy from the exhaust stream is transferred to the matrix material, and then transferred from the matrix material to the supply stream, thereby raising the temperature and/or humidity of the supply stream by an amount that is proportional to the temperature and/or humidity differential between the air streams. During a summer mode of operation, the process is reversed, in that energy is transferred from the supply stream to the wheel, and into the exhaust stream, thereby cooling and/or dehumidifying the supply stream before it passes into an enclosed structure.

A typical rotary wheel includes a housing having an internal channel that rotatably retains a wheel. The wheel rotates within the housing to condition supply air. A circumferential or perimeter seal may be secured around a circumference of the channel into which the wheel is rotatably secured. The perimeter seal sealingly engages an outer circumference of the wheel as it rotates within the housing. Thus, the supply air upstream from the rotary wheel in a supply stream is prevented from intermingling with the supply air that is downstream from the rotary wheel in the supply stream. Similarly, exhaust air upstream from the rotary wheel in an exhaust stream is prevented from intermingling with the exhaust air that is downstream from the rotary wheel in the exhaust stream. Without the perimeter seal, air could bypass the wheel and reduce the amount of heat and moisture transfer between the supply air and the exhaust air.

In addition to the perimeter seal, the rotary wheel may also include one or more face seals. The face seals sealingly separate the supply air from the exhaust air.

A brush seal is one type of known face seal. The brush seal is typically resilient and able to adapt to most deviations in the surface of the wheel as it rotates. Typically, the deviations are between 1-4 mm, causing the brush seal to deflect accordingly. However, if the brush seal is too far away from the face, a large surface deviation may cause the brush seal to lose contact with the face of the wheel, thereby causing an air leak.

Higher pressure differentials between supply and exhaust airstreams may force the brush seal away from the face of the wheel, thereby causing the brush seal to deflect and lose contact with the face. Accordingly, air may escape through the gap between the brush seal and the face of the wheel. Clearly, as the brush seal loses contact with the face, the performance of the face seal rapidly diminishes.

Another type of know face seal is a labyrinth seal that is placed proximate a face of a rotary wheel. In order for air to flow through a narrow passageway between a distal end of the labyrinth seal and the face, a large pressure drop is induced. The pressure drop reduces the amount of flow past the labyrinth seal. Typically, labyrinth seals are formed of rubber or plastic. Although labyrinth seals perform well when located very close to the face of the rotary wheel, they do not perform well at greater distances (for example, a distance that exceeds 1/16" away from the face of the rotary wheel). If the wheel wobbles (that is, vertical run-out), in which the distance from the labyrinth seal to the wheel face varies as the wheel rotates, or if the face has any variation in height, labyrinth seals do not perform well. Yet, the labyrinth seals typically have to be positioned far enough away from the wheel so that they do not come into contact with the wheel as it rotates, which may damage the wheel. Generally, labyrinth seals typically do not contact the wheel. Moreover, because the labyrinth seals are made of materials (such as rubber) that are configured to not damage the wheel if contact does occur, the materials are typically not resilient and often wear down over relatively short periods of time.

Another type of face seal is a contact seal and is typically more effective than a labyrinth seal because it includes a rubber strap, for example, that directly contacts a face of a wheel. Unlike a brush seal, the rubber strap is not porous. Contact seals typically wear quickly over time because they are formed of materials such as rubber, nylon, or fabric that are generally soft so that they will not damage the wheel. In general, it has been found that typical contact seals wear out and behave like poorly-designed labyrinth seals with increased wear and tear. Most contact seals are susceptible to lifting off the surface of the face of the wheel when exposed to high pressure differentials.

SUMMARY OF THE INVENTION

Certain embodiments provide a rotary wheel assembly configured for use with a system for conditioning air supplied to an enclosed structure. The rotary wheel is configured to be positioned within a supply air stream and an exhaust air stream. The assembly includes a cassette frame, a wheel rotatably secured within the cassette frame, and a self-adjusting seal subassembly configured to maintain sealing engagement with respect to a surface of the wheel. The self-adjusting seal subassembly includes at least one seal member.

In at least one embodiment, the seal member may include a membrane configured to be inflated or filled with a fluid, and a wear strip secured to the membrane. The wear strip maintains sealing engagement with the surface of the wheel through the membrane forcing the wear strip into the surface of the wheel. The membrane may be inflated with air. The wear strip may be formed of one or more of Teflon, Ultra-High Molecular Weight (UHMW) polyethylene, polypropylene, acetal, or nylon. Optionally, the wear strip may be omitted if a highly-durable membrane is used. The surface of the wheel may be a face of the wheel. The surface of the wheel may be a circumferential edge of the wheel.

In at least one embodiment, the self-adjusting seal subassembly may include a spring-biased device that forces the seal member into sealing contact with the surface of the wheel. The spring-biased device may include a main housing and a seal bracket moveably secured to the main housing. The seal member extends from the seal bracket. The spring-biased device may also include a spring member secured within the main housing and the seal bracket. The spring member exerts a spring force into the main housing and the seal bracket. The spring member may include a coil compression spring. The seal member may include one or more of a brush seal, a labyrinth seal, or a contact seal. Optionally, the seal member may include a roller. Alternatively, the seal member may include an elastic beam, and a wear strip secured to the elastic beam, wherein the wear strip contacts the surface of the wheel. The surface of the wheel may be a face of the wheel. Optionally, the surface of the wheel may be a circumferential edge of the wheel.

In at least one embodiment, the self-adjusting seal subassembly may include a seal holder pivotally connected to a bracket through a hinge, wherein the seal member extends from the seal holder toward the wheel, and at least one force-exerting member operatively connected to the seal holder, wherein the at least one force-exerting member is configured to force the seal member into the surface of the wheel. The force-exerting member may include a rotary spring. Optionally, the force-exerting member may include a coil spring. Alternatively, the force-exerting member may include an elastic strap secured to the seal holder and the bracket. The force-exerting member may exert a force into the seal holder in a direction that is parallel to a direction of rotation of an edge of the wheel. Alternatively, the force-exerting member may exert a force into the seal holder in a direction that is perpendicular to the direction of rotation of an edge of the wheel. The surface of the wheel may be a face of the wheel. The surface of the wheel may be a circumferential edge of the wheel.

In at least one embodiment, the seal member includes a roller rotatably secured to the cassette frame. The roller may include a main cylindrical body formed of a first material, and a circumferential low-friction outer layer formed of a second material surrounding at least a portion of the main cylindrical body. Optionally, the roller may be formed of a single material. The outer layer is configured to engage the surface of the wheel. The first material differs from the second material. The first material may include one or more of silicone, neoprene, buna-n rubber, polyurethane, ethylene propylene diene monomer (EPDM) rubber, thermoplastic vulcanizates (TPV) rubber, thermoplastic elastomers (TPE), terafluoroethylene-propylene rubber, vinyl rubber, butyl rubber, epicholohydrin (ECH) rubber, fluorosilicone rubber, gum rubber, latex rubber, Teflon, UHMW polyethylene, or polypropylene. The second material may include one or more of Teflon, UHMW polyethylene, polypropylene, acetal, or nylon.

The roller may include a single cylindrical main body that extends over a diameter of the wheel. Optionally, the roller may include a plurality of separate and distinct roller segments. Also, the roller may include a main body that tapers down from a circumferential edge of the wheel to a center of the wheel. A first diameter of the roller proximate the circumferential edge is greater than a second diameter of the roller proximate the center. In at least one embodiment, the roller may drive rotation of the wheel. That is, the roller may be operatively connected to a motor that causes the roller to rotate. The rotation of the roller may, in turn, drive rotation of the wheel that contacts the roller.

In at least one embodiment, the seal member may include an elastic beam, and a low-friction wear strip secured to the elastic beam, wherein the wear strip contacts the surface of the wheel. Optionally, the low-friction wear strip may be omitted. The elastic beam may be formed of rubber. The elastic beam may have a D-shape. Additionally, the elastic beam may be secured to an elastic bracket. The elastic bracket and the elastic beam may be formed of separate and distinct elastic materials.

In at least one embodiment, the self-adjusting seal subassembly includes at least one air fin secured to a seal holder that is moveably secured to the cassette frame, wherein seal member extends from the seal holder. The air fin(s) moves the seal holder with respect to the cassette frame through air pressure.

The self-adjusting seal subassembly may provide an outdoor air correction factor (OACF)<1.05 when exposed to a pressure differential >3 in. w.g. throughout its lifespan. The self-adjusting seal subassembly may provide an outdoor air correction factor (OACF)<1.08 when exposed to a pressure differential >5 in. w.g. throughout its lifespan.

The supply air stream may include air from outside of the enclosed structure. Alternatively, the supply air stream may include air from inside of the enclosed structure. Also, the supply air stream may include ambient air.

The exhaust air stream may include air from inside of the enclosed structure. Alternatively, the exhaust air stream may include air from outside of the enclosed structure. Also, the exhaust air stream may include ambient air.

Certain embodiments provide a method of automatically adjusting a seal with respect to a wheel of a rotary wheel assembly configured for use with a system for conditioning air to be supplied to an enclosed structure, wherein the rotary wheel is configured to be positioned within a supply air stream and an exhaust air stream. The method includes contacting a surface of the wheel with at least one seal member, and exerting a resistive force into the seal member or a seal holder from which the seal member extends to ensure that the seal member remains in contact with the wheel. The exerting occurs automatically through one or more of the seal member or an assembly that includes the seal member.

The automatic exertion maintains contact with the surface of the wheel (even if there are uneven deviations on the surface of the wheel) when a pressure differential between the supply air stream and the exhaust air stream changes during operation. The automatic exertion compensates for: wear of the seal, temperature and humidity variations, and/or frost or condensation on the surface of the wheel and/or the seal. Additionally, the automatic exertion compensates for the presence of contaminants in the air or on the wheel.

Certain embodiments provide a self-adjusting seal assembly configured to maintain sealing engagement with respect to a surface of a rotary wheel configured to be positioned within a supply air stream and an exhaust air stream. The self-adjusting seal assembly may include a membrane including foam, and a wear strip secured to at least a portion of the membrane. One or both of the membrane and the foam may be configured to urge the wear strip into sealing engagement with a surface of the wheel. The membrane may be formed entirely of the foam, or may include foam contained within another material, such as an elastomeric material, for example.

The wear strip may be formed of one or more of Teflon, Ultra-High Molecular Weight (UHMW) polyethylene, polypropylene, acetal, delrin, polyurethane, or nylon. The membrane may include one or more of Teflon, UHMW polyethylene, polypropylene, acetal, or nylon.

The surface of the rotary wheel may be a face of the rotary wheel. Alternatively, the surface of the rotary wheel may be a circumferential edge of the rotary wheel.

The foam may be an open cell foam. A layer of tape may be disposed between an outer surface of the foam and an inner surface of the membrane. One or both of the foam and the membrane may be sized and shaped to provide a flat, planar interface with the wear strip.

The wear strip may include a plurality of wear strip segments. The wear strip may include a plurality of grid elements.

Certain embodiments provide a rotary wheel assembly configured for use with a system for conditioning air supplied to an enclosed structure. The rotary wheel assembly may be configured to be positioned within a supply air stream and an exhaust air stream. The assembly may include a cassette frame, a wheel rotatably secured within the cassette frame, and a self-adjusting seal subassembly configured to maintain sealing engagement with respect to a surface of the wheel. The self-adjusting seal subassembly may include a membrane containing foam, and a wear strip secured to at least a portion of the membrane. One or both of the membrane and the foam urge the wear strip into sealing engagement with a surface of the wheel.

BRIEF DESCRIPTION OF THE DRAWINGS

FIG. 15 illustrates an end view of a face seal engaging a face of a rotary wheel, according to an embodiment.

FIG. 16 illustrates an end view of a face seal engaging a face of a rotary wheel, according to an embodiment.

FIG. 17 illustrates an end view of a face seal engaging a face of a rotary wheel, according to an embodiment.

FIG. 18 illustrates an end view of a face seal engaging a face of a rotary wheel, according to an embodiment.

DETAILED DESCRIPTION OF THE DRAWINGS

The foregoing summary, as well as the following detailed description of certain embodiments will be better understood when read in conjunction with the appended drawings. As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Figure 1:
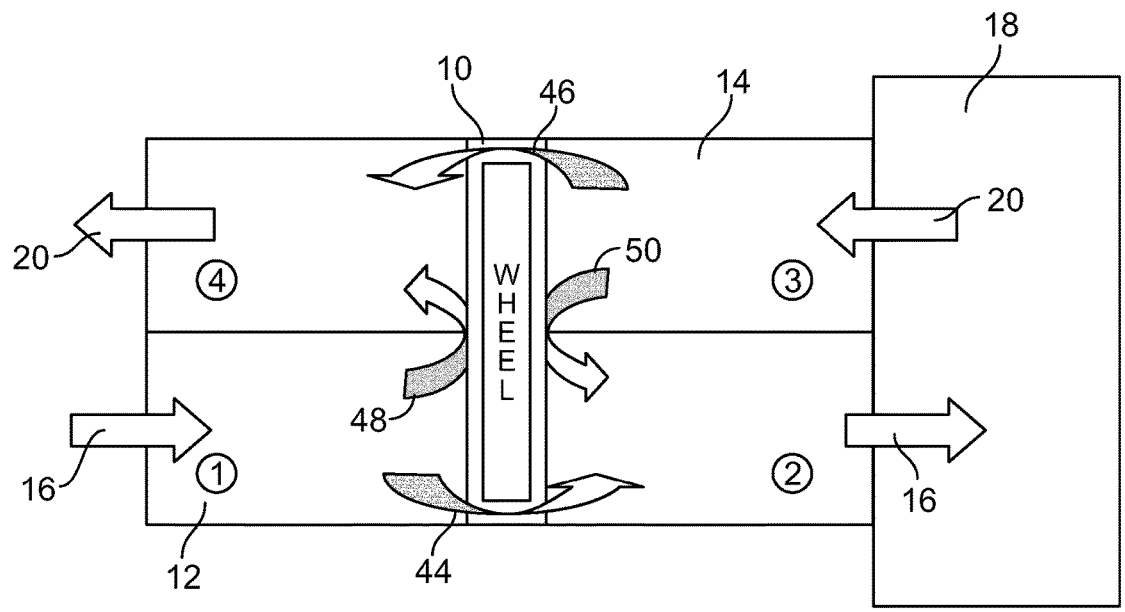
FIG. 1 illustrates a schematic diagram of a rotary wheel assembly disposed within a supply stream and an exhaust stream.

FIG. 1 illustrates a schematic diagram of a rotary wheel assembly 10 disposed within a supply stream 12 and an exhaust stream 14. Supply air 16 enters the supply stream 12 and encounters the rotary wheel assembly 10. During a winter mode of operation, sensible (heat) and/or latent (moisture) energy is transferred from the rotary wheel assembly 10 to the air 16 before it passes into an enclosed structure 18, or passed to additional downstream HVAC equipment. During a summer mode of operation, sensible and/or latent energy is transferred from the air 16 to the rotary wheel assembly 10 before the air 16 passes into the enclosed structure 18, or passed to additional downstream HVAC equipment. Likewise, exhaust air 20 from the enclosed structure 18 encounters the rotary wheel assembly 10 in the exhaust stream 14. Energy is either transferred to, or from, the exhaust air 20 in relation to the rotary wheel assembly 10 before it is exhausted to the environment.

The rotary wheel assembly 10 may be used to transfer heat (sensible energy), moisture (latent energy), or both between the exhaust stream 14 and the supply stream 12. In general, the rotary wheel assembly 10 is used to precondition the supply air 16 to a more suitable condition. The rotary wheel assembly 10 reduces the amount of air post-conditioning before the air 16 enters the enclosed structure 18.

In one embodiment, the supply air 16 may be outdoor air and the exhaust air 20 may be air from the building space.

Alternatively, both the supply air 16 and exhaust air 20 may include outdoor ambient air. In this case, the exhaust air 20 may generally be defined as scavenger air, and is typically pre-cooled before passing through the assembly 10.

Also, alternatively, the exhaust air 20 may include outdoor ambient air, while the supply air 16 may include recirculated air from the enclosed structure 18. In this case, the exhaust air 20 may generally be defined as scavenger air, and may be pre-cooled before passing through the assembly 10. The supply air 16 may be cooled by the assembly 10 and sent back into the enclosed structure 18. Such a configuration may be used with respect to an indirect evaporative cooling setup for data centers or building zones with high sensible heat loads.

Additionally, in another embodiment, the supply air 16 (which may also be referred to as process air) may include ambient air, return air, or a mixture of both, and the exhaust air 20 (which may also be referred to as regeneration air) may include ambient air, return air or a mixture of both.

Figure 2:
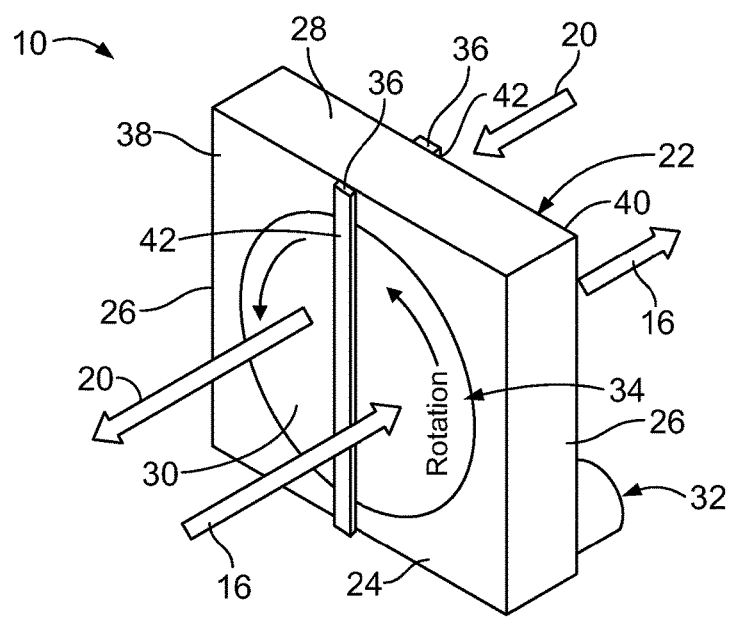
FIG. 2 illustrates an isometric front view of a rotary wheel assembly, according to an embodiment.

FIG. 2 illustrates an isometric front view of the rotary wheel assembly 10. The rotary wheel assembly 10 includes a housing or cassette frame 22 having a base 24 integrally connected to lateral walls 26, and an upper wall 28. The walls 24 define an internal channel that rotatably retains a wheel 30. The wheel 30 rotates within the cassette frame 22 to condition the supply air 16. As shown, the supply air 16 passes through one side of the wheel 30, while the exhaust air 20 passes through the opposite side of the wheel 30. Heat and/or moisture are transferred between the air stream 16 and 18 due to the rotation of the wheel 30. Desiccant may be included in, or applied on, the wheel 30 to provide moisture transfer between the air streams 16 and 20. Notably, the rotational speed of the wheel 30 within the cassette frame 22 affects the amount of heat and moisture transfer between the air streams 16 and 20. If a desiccant-coated wheel 30 turns slowly, the wheel primarily transfers moisture between the air streams 16 and 20. If the wheel 30 turns faster, both moisture and heat are transferred between the air streams 16 and 20.

The wheel 30 may be rotated through a motor 32 that is operatively connected to the wheel 30 through a direct drive, gear drive, or belt (not shown). A circumferential or perimeter seal 34 is secured around a circumference of the channel into which the wheel 30 is rotatably secured. The perimeter seal 34 sealingly engages the outer circumference of the wheel 30 as it rotates within the cassette frame 22. Thus, the supply air 16 upstream from the rotary wheel assembly 10 in the supply stream 12 is prevented from intermingling with the supply air 16 that is downstream from the rotary wheel assembly 10 in the supply stream 12. Similarly, the exhaust air 20 upstream from the rotary wheel assembly 10 in the exhaust stream 14 is prevented from intermingling with the exhaust air 20 that is downstream from the rotary wheel assembly 10 in the exhaust stream 14. Without the perimeter seal 34, air could bypass the wheel 30 and reduce the amount of heat and moisture transfer between the supply air 16 and the exhaust air 20.

In addition to the perimeter seal 34, the rotary wheel assembly 10 may also include face seals 36. The face seals 36 may be positioned on both the front 38 and back 40 of the rotary wheel assembly 10 and include a support bracket 42 that bisects the wheel 30. The bracket 42 is generally secured to the cassette frame 22 proximate the top wall 38 and the base 24, although the bracket 42 may be secured between the lateral walls 26. The face seals 36 sealingly separate the supply air 16 from the exhaust air 20 within the rotary wheel assembly 10.

Referring again to FIG. 1, if no perimeter seal was used, supply air 16 upstream from the rotary wheel assembly 10 within the supply stream 12 could bypass the wheel 30 through a circumferential leak path 44. Similarly, if no perimeter seal was used, exhaust air 20 upstream from the rotary wheel assembly 10 within the exhaust stream 14 could bypass the wheel 30 through a circumferential leak path 46. Further, an inadequate perimeter seal would also allow leaks through the leak paths 44 and 46. Circumferential or perimeter leakage results in lower effectiveness and a decrease in pressure drop.

Also, if no face seals were used (or if faulty or shoddy face seals are used), supply air 16 within the supply stream 12 upstream from the rotary wheel assembly 10 could leak into the exhaust stream downstream from the rotary wheel assembly 10 within the exhaust stream 20 through a diametric leak path 48. Similarly, exhaust air 20 within the exhaust stream 14 upstream from the rotary wheel assembly 10 could leak into supply air 16 within the supply stream 12 downstream from the rotary wheel assembly 10 through a diametric leak path 50. Notably, the direction of leakage depends on the pressure within the air streams 16 and 20 both downstream and upstream from the rotary wheel assembly 10. In general, air will leak from high pressure to low pressure. If the exhaust air 20 contains contaminants from the enclosed space 18, the contaminants may be transferred to the supply air 16 entering the enclosed space 18.

Referring to FIG. 1, in order to quantify the amount of contamination, the rotary wheel assembly 10 may be tested using tracer gas resting (AHRI Standard 1060). In order to perform this test, tracer gas is injected into station 3, and the concentration of the tracer gas is measured in stations 1, 2, and 3. Using these concentrations, the exhaust air transfer ration (EATR) is calculated as:

$$EATR=(c_2-c_1)/(c_3-c_1)$$

where c is the tracer gas concentration (%), 1 is the measurement at station 1, 2 is the measurement at station 2, and 3 is the measurement at station 3.

The EATR is also impacted based on the geometry of the media of the rotary wheel assembly 10, and the speed at which the wheel 30 (shown in FIG. 2) rotates. A small volume of air may become trapped in the wheel media and openings, as the wheel 30 rotates. Therefore, this small volume of air is transferred from one air stream 16 or 20 to the other air stream 16 or 20. The faster the wheel 30 rotates, the more carryover occurs. The carryover volume is estimated by the following:

$$COV=(\gamma \omega L)/\pi V$$

where COV is the carryover volume ratio (%), γ is the porosity (dimensionless), L is the flow channel length (m), and V is the air velocity (m/s).

To reduce the amount of carryover, a purge section may be added to the cassette frame 22 (shown in FIG. 2). The purge section may use outdoor air to flush the exhaust air out of the media before the wheel 30 rotates to the supply side.

The EATR may also be impacted if contaminants are adsorbed by the desiccant or the wheel media material, as it rotates from one airstream to the other.

Air leaking from one station to another may create an imbalance in the air streams 16 and 20. For example, if airflow leakage occurs from station 1 to station 4, then the amount of airflow at station 2 can be lower than at station 1 (assuming no leakage from station 3 back to station 2). This phenomena is quantified by using an outdoor air correction factor (OACF), which is calculated as follows:

$$OACF=(CFM_1)/(CFM_2)$$

where CFM1 is the airflow rate at station 1, and CFM2 is the airflow rate at station 2.

The OACF represents a multiplier that is used when calculating the amount of outdoor air to be supplied in order to achieve a desired supply air. Therefore, the amount of outdoor air that is to be supplied to achieve the desired supply air is found by rearranging the OACF equation noted above as follows:

$$CFM_1=(CFM_2)(OACF)$$

However, air leaks reduce the ability of achieving the desired supply air. Therefore, the rotary wheels assembly 10 includes perimeter and face seals.

Figure 3:
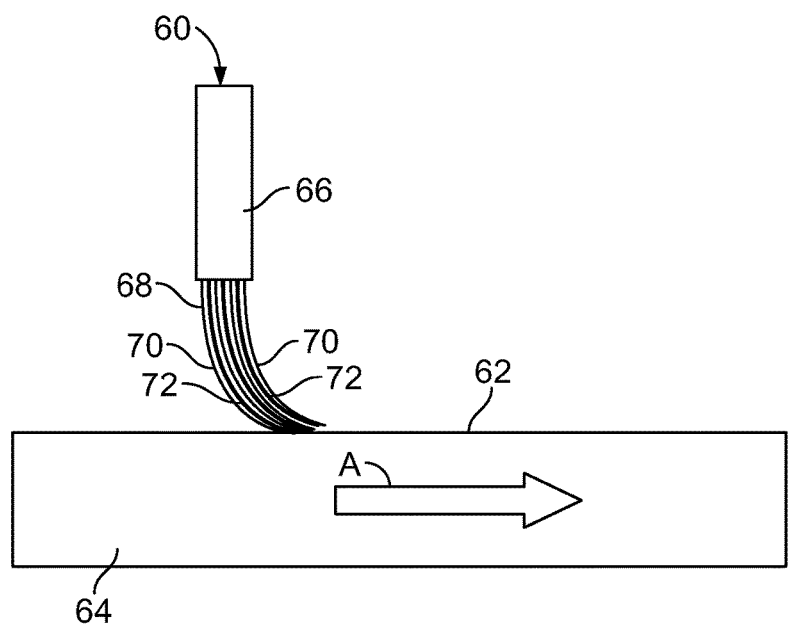
FIG. 3 illustrates an end view of a brush seal engaging a face of a wheel, according to an embodiment.

FIG. 3 illustrates an end view of a brush seal 60 engaging a face 62 of a wheel 64, according to an embodiment. The brush seal 60 includes a holder bracket 66 that may be connected to the bracket 42 (shown in FIG. 2) through a face-engaging subassembly (not shown in FIG. 3). A seal 68 extends from the holder bracket 66 toward the face 62 of the rotary wheel 64. The seal 68 includes a plurality of small nylon or natural fiber filaments 70 having distal ends 72 that contact the face 62 of the rotary wheel 64. Alternatively, the seal 68 may include a plurality of other non-natural fibers, such as polypropylene fibers. The filaments 70 are arranged in a thin brush strip.

As the rotary wheel 64 rotates in the direction of arrow A, the brush seal 60 deflects in the same direction. Typically, the brush seal 60 is set close enough to the face 62 so that when the brush seal 60 deflects, the filaments 70 maintain contact with the face 62. The brush seal 60 is typically resilient and able to adapt to most deviations in the surface of the wheel 64 as it rotates.

The brush seal 60 may be used as a seal member for any of the embodiments described with respect to FIGS. 10-20 and 33, for example.

Figure 4:
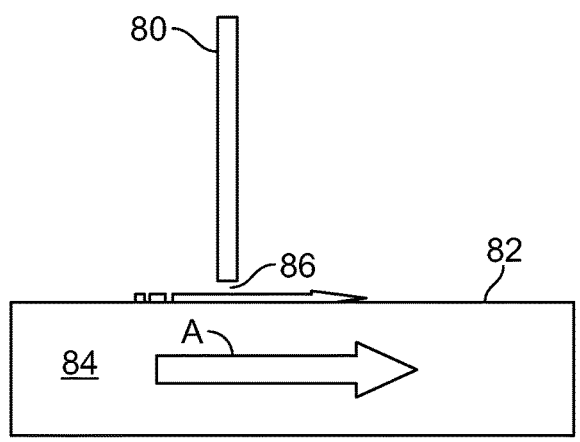
FIG. 4 illustrates an end view of a labyrinth seal proximate a face of a rotary wheel, according to an embodiment.

FIG. 4 illustrates an end view of a labyrinth seal 80 proximate a face 82 of a rotary wheel 84, according to an embodiment. In order for air to flow through a narrow passageway 86 between the distal end of the seal 80 and the face 82, a large pressure drop is induced. The pressure drop reduces the amount of flow past the seal 80. As shown in FIG. 4, the labyrinth seal 80 may be a single element labyrinth seal. The labyrinth seal 80 may be used as a seal member for any of the embodiments described with respect to FIGS. 10-20 and 33, for example.

Figure 5:
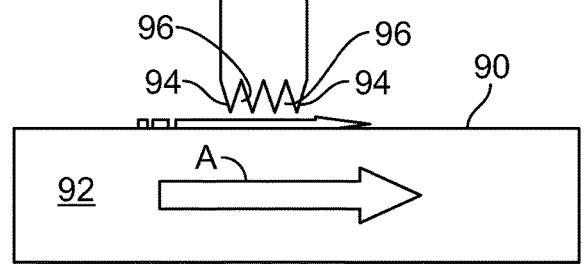
FIG. 5 illustrates an end view of a labyrinth seal proximate a face of a rotary wheel, according to an embodiment.

FIG. 5 illustrates an end view of a labyrinth seal 88 proximate a face 90 of a rotary wheel 92, according to an embodiment. The labyrinth seal 88 is a grooved labyrinth seal having a series of peaks 94 separated by grooves 96. The peaks 94 are proximate the face 90 of the rotary wheel 92. In general, the multiple peaks 94 provide a more difficult path for air to travel past.

Referring to FIGS. 4 and 5, the seals 80 and 88 may be formed of rubber or plastic, for example. The seals 80 or 88 may be used as a seal member for any of the embodiments described with respect to FIGS. 10-20 and 33, for example.

Figure 6:
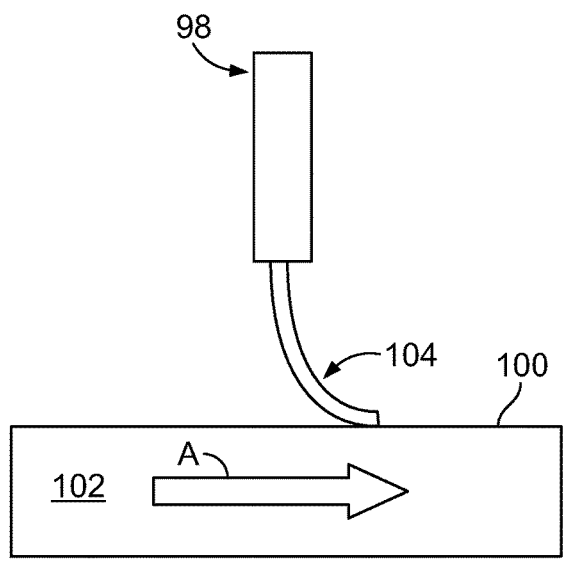
FIG. 6 illustrates an end view of a contact seal engaging a face of a rotary wheel, according to an embodiment.

FIG. 6 illustrates an end view of a contact seal 98 engaging a face 100 of a rotary wheel 102, according to an embodiment. The contact seal 98 includes a strap 104, such as rubber, that directly contacts the face 100. Unlike a brush seal, the strap 104 is not porous. Instead, the strap 104 may be a contiguous rubber strap that extends along the entire length of the bracket 42 (shown in FIG. 2). The strap 104 deflects with rotation of the wheel assembly 102, maintaining sealing contact therewith. The contact seal 98 may be used a seal member for any of the embodiments described with respect to FIGS. 10-20 and 33, for example.

Figure 7:
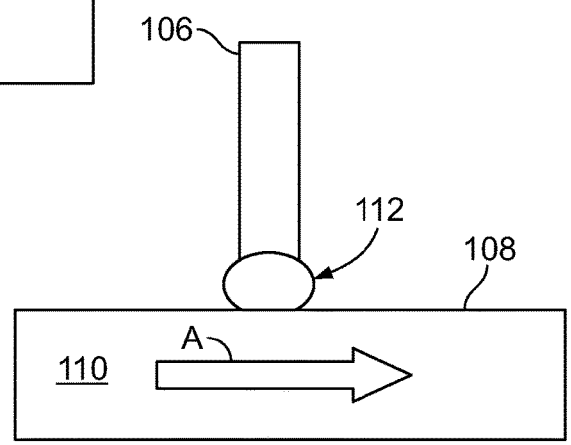
FIG. 7 illustrates an end view of a contact seal engaging a face of a rotary wheel, according to an embodiment.

FIG. 7 illustrates an end view of a contact seal 106 engaging a face 108 of a rotary wheel 110, according to an embodiment. The contact seal 106 includes a bulb 112, such as a rubber bulb, that contacts the face 108. The contact seal 106 may be used as a seal member for any of the embodiments described with respect to FIGS. 10-20 and 33, for example.

Figure 8:
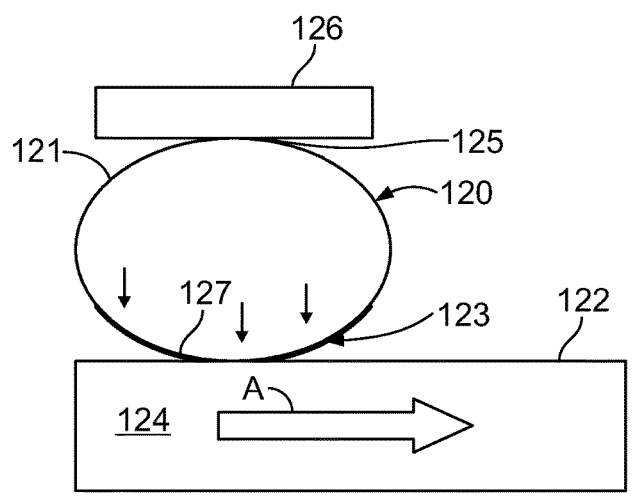
FIG. 8 illustrates an end view of a face seal engaging a face of a rotary wheel, according to an embodiment.

FIG. 8 illustrates an end view of a face seal 120 engaging a face 122 of a rotary wheel 124, according to an embodiment. The face seal 120 includes an inflated membrane 121, balloon, tube, beam, or the like secured to a bracket 126 (such as the bracket 42 shown in FIG. 1). An upper surface 125 of the membrane 121 may be bonded to the bracket 126, or secured thereto via adhesives, such as glue. The membrane 121 may be formed of rubber or other such materials that prevent air from escaping. The membrane 121 may be inflated and/or filled with a fluid, such as air, water, or the like.

A wear strip 123 may be secured to a lower surface 127 of the membrane 121. In general, the wear strip 123 is used to increase the lifespan of the sealing interface, but may be omitted. The wear strip 123 may be secured to the lower surface 127 through bonding, adhesives, or the like. The wear strip 123 may be formed of a slippery, low-friction material such as, but not limited to, Teflon, Ultra-High Molecular Weight (UHMW) polyethylene, polypropylene, acetal, and/or nylon.

The fluid pressure within the membrane 121 forces the membrane 121 and/or wear strip 123 into constant contact with the face 122 of the wheel 124. As shown in FIG. 8, the membrane 121 forces the wear strip into the face 122 of the wheel 124 in a direction that is generally perpendicular to the circumferential direction of rotation of the wheel 124 denoted by arrow A. Because the wear strip 123 is formed of a non-stick material, such as noted above, the wear strip 123 does not snag, tear, or otherwise damage the wheel 124. The membrane 121 ensures that the wear strip 123 maintains contact with the face 122 regardless of differential pressures or surface deviations on the face 122. In addition to not damaging the face 122, the wear strip 123 is less susceptible to wearing down than rubber, for example.

While the membrane 121 may be inflated with air, various other fluids may be used in addition to, or in lieu of, air. For example, the membrane 121 may be filled with liquid, gel, foam, rubber, or various other materials in order to force the wear strip 123 into the face 122 of the wheel 124. Accordingly, the face seal 120 provides an adaptable, self-adjusting, reliable and durable seal.

Figure 9:
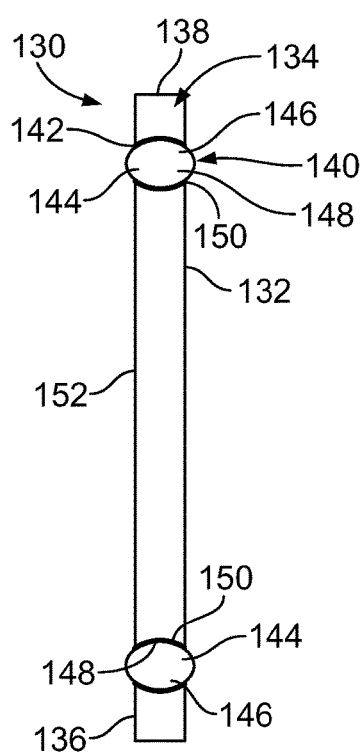
FIG. 9 illustrates a transverse cross-sectional view of a rotary wheel, according to an embodiment.

FIG. 9 illustrates a transverse cross-sectional view of a rotary wheel 130, according to an embodiment. The rotary wheel 130 includes a wheel 132 secured within a cassette bracket 134 having a base 136 and a top wall 138. A perimeter or circumferential seal 140 may be secured to an inner diameter 142 of the cassette bracket 134 and may encircle the outer circumference of the wheel 132. The seal 140 may include an inflatable or fillable membrane 144 having an outer portion 146 secured to the cassette bracket 134, and an inner portion 148 secured to a circumferential wear ring 150. The inflatable membrane 144 may be formed of rubber or other such materials that prevent air from escaping. The membrane 144 may be inflated with a fluid, such as air, for example. The wear ring 150 may be formed of a slippery, low-friction plastic such as Teflon, Ultra-High Molecular Weight (UHMW) polyethylene, or the like, as noted above. In this manner, the seal 140 may provide a seal with respect to the outer perimeter of the wheel 132 similar to the membrane 121 (shown in FIG. 8) providing a seal with respect to the 152 face of the wheel 152. Indeed, the rotary wheel 130 may also include a face seal, such as shown in FIG. 8. Accordingly, the circumferential seal 140 provides an adaptable, self-adjusting, reliable and durable seal.

While the seal 140 is shown and described as being secured to the cassette 134, the seal 140 may alternatively be secured to an outer circumference of the wheel 132. That is, the seal 140 may be bonded or otherwise secured to an outer circumferential edge of the wheel 132, while a wear ring may be secured to an outer circumference of the seal 140 and configured to contact an inner diameter of the cassette 134.

Figure 10:
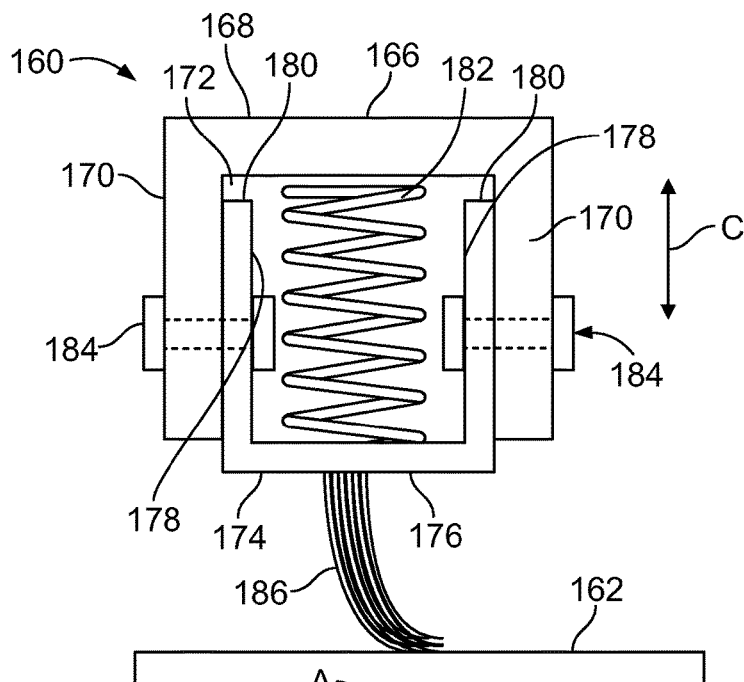
FIG. 10 illustrates an end view of a face seal engaging a face of a rotary wheel, according to an embodiment.

FIG. 10 illustrates an end view of a face seal 160 engaging a face 162 of a rotary wheel 164, according to an embodiment. The face seal 160 includes a main housing 166 that may be part of the bracket 42 (shown in FIG. 1). Optionally, the main housing 166 is secured to the bracket through fasteners, bonding, or the like. The main housing 166 includes a crossbeam 168 integrally connected to perpendicular walls 170 at either end of the crossbeam 168. The crossbeam 168 and walls 170 define an internal chamber 172.

A seal bracket 174 or holder is moveably secured within the internal chamber 172. The seal bracket 174 includes a crossbeam 176 integrally connected to perpendicular walls 178 at either end of the crossbeam 176. Free ends 180 of the walls 178 are positioned within the internal chamber 172 proximate the crossbeam 168 of the main housing 166. As such, the main housing 166 and the seal bracket 174 form an enclosure that securely retains a spring member 182, such as a coil spring as shown. However, the spring member 182 may be any spring-biased device, such as a leaf spring, or the like, that exerts a spring constant into the crossbeams 168 and 176.

As shown in FIG. 10, the seal bracket 174 is secured to the main housing 166 through fasteners 184, such as bolts, that pass through the walls 170 of the main housing 166 and the walls 178 of the seal bracket 174. In general, either the walls 170 or the walls 178 include fastener through holes that are approximately the same diameter as the shafts of the fasteners 184, while the other of the walls 170 or 178 include aligned longitudinal slots that receive the fasteners 184 and allow the seal bracket 174 to slide relative to the main housing 166 in the directions of arrow C.

The seal bracket 174 also includes a sealing member 186 extending from the crossbeam 176 toward the face 162 of the wheel 164. As shown in FIG. 10, the sealing member 186 may be a brush seal. However, the seal member 186 may be any of the seal members shown in FIGS. 3, and 6-8. For example, instead of a brush seal, the seal member 186 may be a sealing strap or strip (as shown in FIG. 6), a bulb (as shown in FIG. 7), or an inflatable membrane with wear strip (as shown in FIG. 8).

The spring member 182 exerts a constant spring force into the seal bracket 174 so that the seal member 186 maintains sealing engagement with the face 162 of the wheel 164. As shown in FIG. 10, the spring member 182 exerts a resistive force in the direction of arrows C, which is generally perpendicular to the circumferential direction of rotation of the wheel 164 denoted by arrow A. If portions of the face 162 are high, the seal member 186 forces the seal bracket 174 up, thereby compressing the spring member 182, which exerts an equal but opposite force into the seal bracket 174 to ensure that the seal member 186 maintains contact with the face 162 of the wheel 164. Similarly, as the wheel 164 continues to rotate in the direction of arrow A, the high portion may transition to a low portion, at which point the constant spring force of the spring member 182 causes the spring member 182 to retract and move the seal bracket 174 back down. During this time, the spring force of the spring member 182 ensures that that the seal member 186 maintains constant sealing engagement with the face 162 of the wheel 164. Accordingly, the face seal 160 provides an adaptable, self-adjusting, reliable and durable seal.

Figure 11:
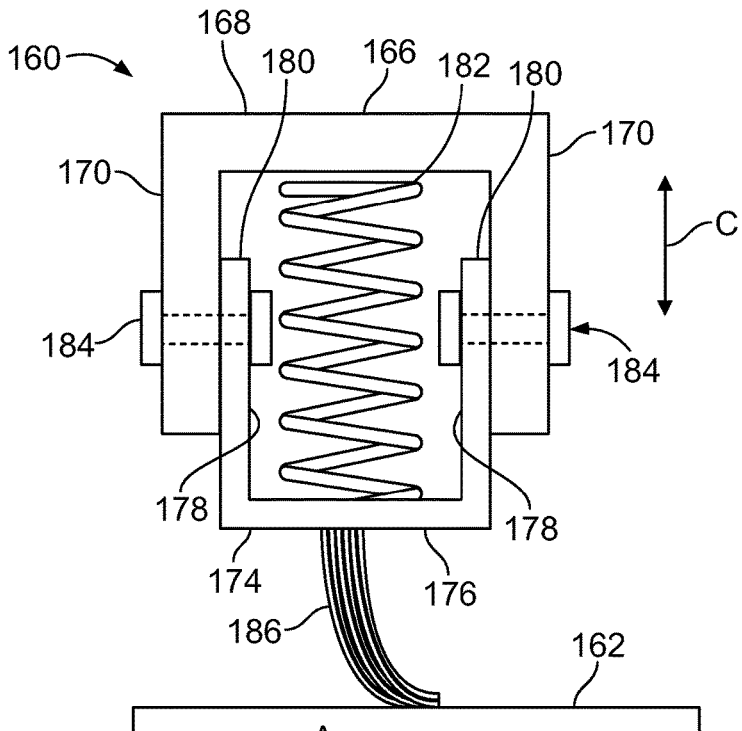
FIG. 11 illustrates an end view of a face seal engaging a face of a rotary wheel, according to an embodiment.

FIG. 11 illustrates an end view of the face seal 160 engaging the face 162 of the rotary wheel 164. As compared to FIG. 10, the seal member 182 is refracted, due to the face 162 of the wheel 164 being further away. However, the constant spring force of the spring member 182 ensures that the seal member 186 maintains sealing engagement with the face 162 of the rotary wheel 164. The spring member 186 acts akin to a shock absorber and moves the seal bracket 174 in directions denoted by arrows C due to the changing distance between the face 162 of the wheel 164 and the main housing 166. The spring member 186 exerts a resistive force into the seal bracket 174 so that the seal member 186 remains in sealing contact with the face 162 of the wheel 164.

Figure 12:
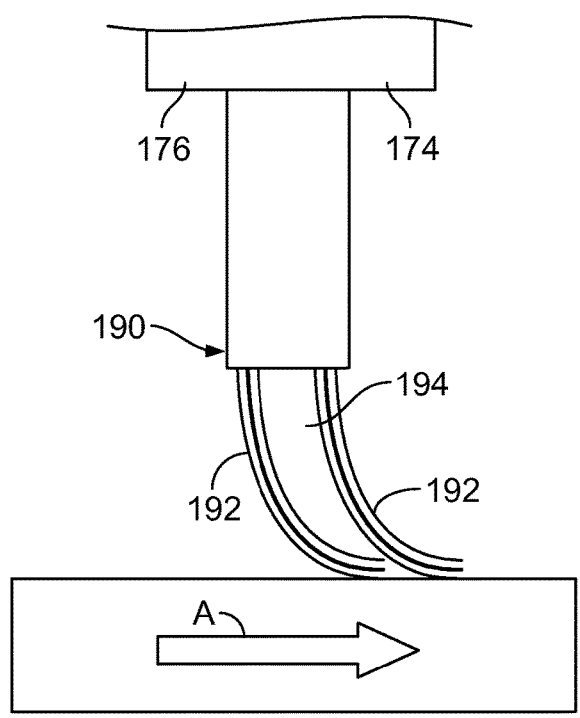
FIG. 12 illustrates a seal member, according to an embodiment.

FIG. 12 illustrates a seal member 190, according to an embodiment. The seal member 190 may be used in place of the seal member 186 shown in FIGS. 10 and 11. The seal member 190 may include, for example, multiple brush seals 192 separated by a gap 194. The aligned brush seals 192 provide redundant, back-up leakage prevention. That is, additional brush layers increase flow restriction, which results in less leakage.

Figure 13:
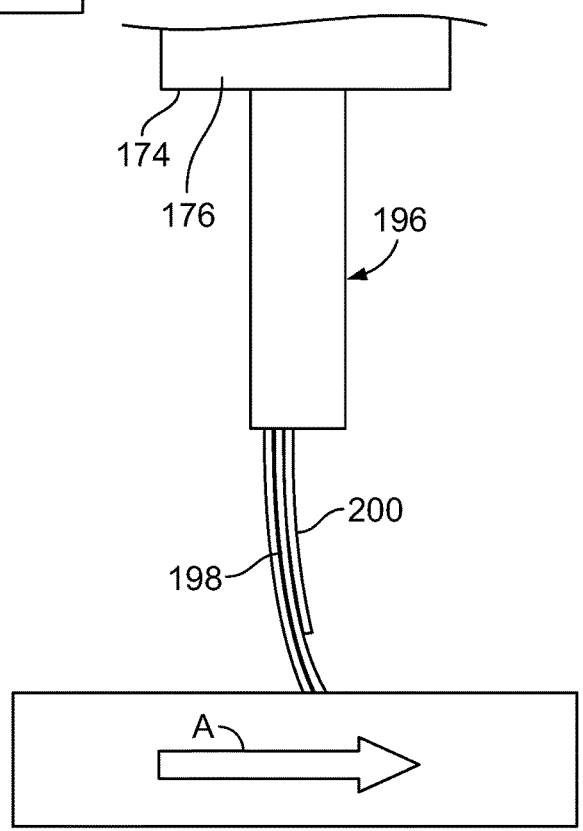
FIG. 13 illustrates a seal member, according to an embodiment.

FIG. 13 illustrates a seal member 196, according to an embodiment. The seal member 196 may be used in place of the seal member 186 shown in FIGS. 10 and 11. The seal member 196 includes a brush seal 198 coupled to a thin rubber or plastic backing 200 or insert. The backing 200 provides a more rigid support for the brush seal 198 that reduces the amount the brush seal 198 deflects under pressure and rotational force.

Figure 14:
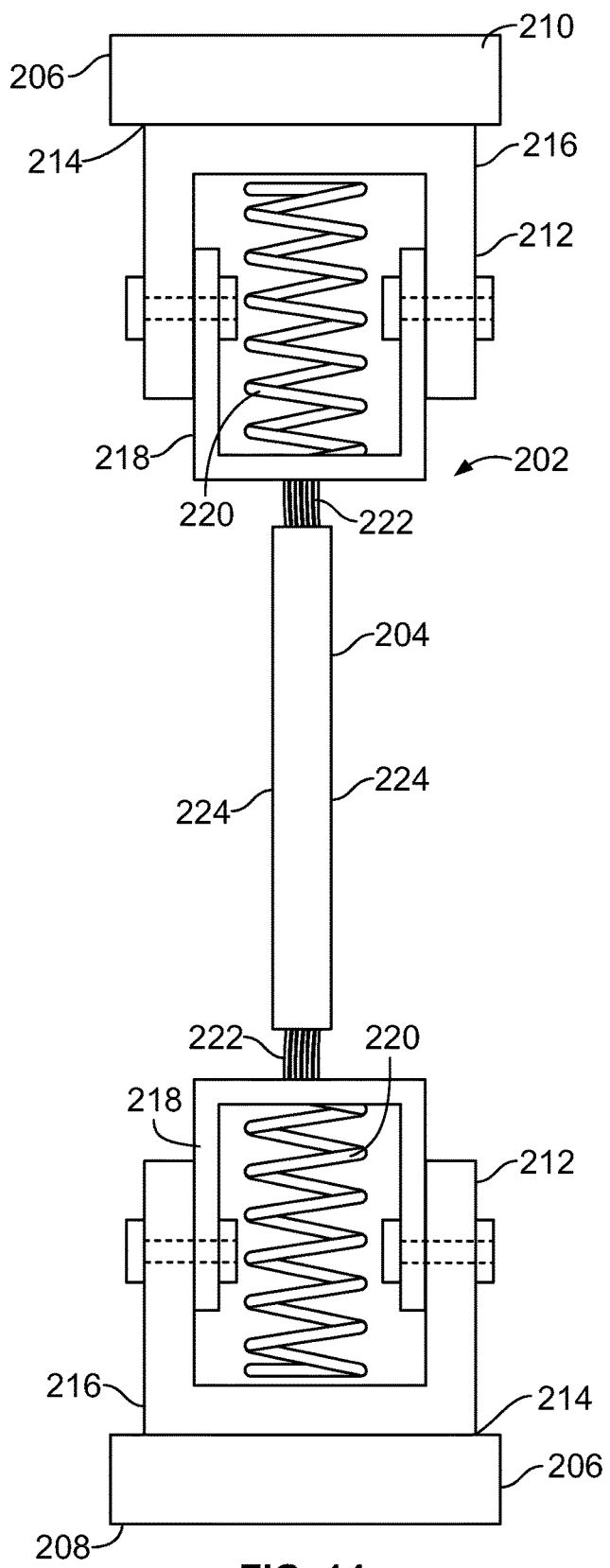
FIG. 14 illustrates a transverse cross-sectional view of a rotary wheel, according to an embodiment.

FIG. 14 illustrates a transverse cross-sectional view of a rotary wheel 202, according to an embodiment. The rotary wheel 202 includes a wheel 204 secured within a cassette bracket 206 having a base 208 and a top wall 210. A circumferential seal assembly 212 may be secured to an inner diameter 214 of the cassette bracket 206 and may encircle the outer circumference of the wheel 202. The seal assembly 212 may include a main housing 216, seal bracket 218, and spring member 220, as described above with respect to FIGS. 10 and 11. However, the main housing 216 and seal bracket 218 may encircle the outer circumference of the wheel 204. Further, a single circular spring member 220 may be contained within the main housing 216 and the seal bracket 218. Optionally, a plurality of spring members 220, such as individual coil or leaf springs, may be positioned therein. The seal assembly 212 includes a circumferential sealing ring 222 that contacts an outer circumference of the wheel 204. The sealing ring 222 may include sealing brushes, inflatable membranes with wear strips, or various other sealing devices, as discussed above. In this manner, the seal assembly 212 may provide a seal with respect to the outer perimeter of the wheel 204 similar to the face seal 160 (shown in FIGS. 10 and 11) with respect to the face 224 of the wheel 204. Indeed, the rotary wheel 202 may also include a face seal, such as shown in FIGS. 10 and 11. Accordingly, the circumferential seal assembly 212 provides an adaptable, self-adjusting, reliable and durable seal.

FIG. 15 illustrates an end view of a face seal 230 engaging a face 232 of a rotary wheel 234, according to an embodiment. The face seal 230 includes a seal holder 236 having a seal member 238 (such as any of those described above). The seal holder 236 is connected to one end 240 of a hinge 242, which also includes an opposite end 244 connected to a face seal bracket 246. The hinge 242 allows the seal holder 236 to pivot with respect to the bracket 246 about the axis 248 of the hinge 242 in the directions of arc D.

A rotary spring 250 is mounted to the bracket 246 and includes a bracket brace 252 that directly connects to the bracket 246 and a holder beam 254 that exerts a resistive force into the seal holder 236. The rotary spring 250 exerts a resistive force into the seal holder 236 in the direction of arrow E, having a component force that is opposite, but parallel, to the direction A of circumferential wheel rotation. Thus, as the wheel 234 rotates, the rotary spring 250 ensures that the seal member 238 remains in constant contact with the face 232 of the wheel 234 no matter the distance between the bracket 246 and the wheel 234. As the wheel 234 rotates, the seal holder 236 pivots about the axis 248 of the hinge 242 based on the level of the face 232. The rotary spring 250 exerts a resistive, absorbing force into the seal holder 236 in the direction of arrow E so that the seal member 238 remains in contact with the face 232 of the wheel 234. More than one rotary spring 250 may be used.

Notably, if air pressure on side L is higher than air pressure on side R, the resistive force of the torsion spring 250 ensures that the spring holder 236 is forced in the direction of arrow E. Therefore, the spring member 238 remains in contact with the face 232 in spite of any pressure differential. If air pressure on side R is higher than on side L, the air pressure simply serves as an additional force to force the spring holder 236 into a position that ensures proper sealing engagement between the spring member 238 and the face 232.

FIG. 16 illustrates an end view of the face seal 230 engaging the face 232 of the rotary wheel 234. As shown with respect to FIGS. 15 and 16, as the distance between the wheel 234 and the bracket 246 changes, the torsion spring 250 forces the seal holder 236 into a position that ensures that the seal member 238 remains in contact with the face 232 of the wheel 234. The seal member 238 may be any of the seal member discussed above. Accordingly, the face seal 230 provides an adaptable, self-adjusting, reliable and durable seal.

Additionally, the seal configuration shown in FIGS. 15 and 16 may be used with respect to a circumferential seal assembly, in a similar manner as shown and described with respect to FIG. 14.

FIG. 17 illustrates an end view of a face seal 260 engaging a face 262 of a rotary wheel 264, according to an embodiment. In this embodiment, the face seal 260 is attached to a fixed bracket 266 having a beam 268 that is parallel to the face 262 of the wheel 264, and a support beam 270 that is perpendicular to the beam 268. The face seal 260 includes a seal holder 272 having a seal member 274 extending from a distal end 276. A proximal end 278 of the seal holder 272 is proximate the support beam 270. A hinge 280 connects to an end 282 of the parallel beam 268 and a mid-section 284 of the seal holder 272. A spring member 286, such as a coil spring, is positioned between the support beam 270 and an upper end 288 of the seal holder 272. The spring member 286 exerts a resistive force into the upper end 288 of the seal holder 272 in the direction of arrow F. The resistive force F is parallel to the rotational direction A of the wheel 264. However, the resistive force F causes the seal holder 272 to pivot about the axis 290 of the hinge 280 so that the seal member 274 is forced into a sealing engagement direction that is opposite the rotational direction A of the wheel 264. In this manner, the sealing member 274 remains in constant sealing engagement with the face 262 of the wheel 264.

FIG. 18 illustrates an end view of the face seal 260 engaging the face 262 of the rotary wheel 264. As shown in FIG. 18, as the distance between the wheel 264 and the beam 268 increases, the resistive force of the spring member 286 forces the upper end 288 of the seal holder 272 away from the upright beam 270. Therefore, as shown in FIG. 18, the seal holder 272 moves to a position that is closer to parallel with the beam 270 than shown in FIG. 18. As such, even though the wheel 264 is farther away from the beam 268, the seal member 274 maintains a sealing contact with the face 262 of the wheel 264.

Accordingly, the face seal 260 provides an adaptable, self-adjusting, reliable and durable seal. Additionally, the seal configuration shown in FIGS. 17 and 18 may be used with respect to a circumferential seal assembly, in a similar manner as shown and described with respect to FIG. 14.

Figures 19, 20:
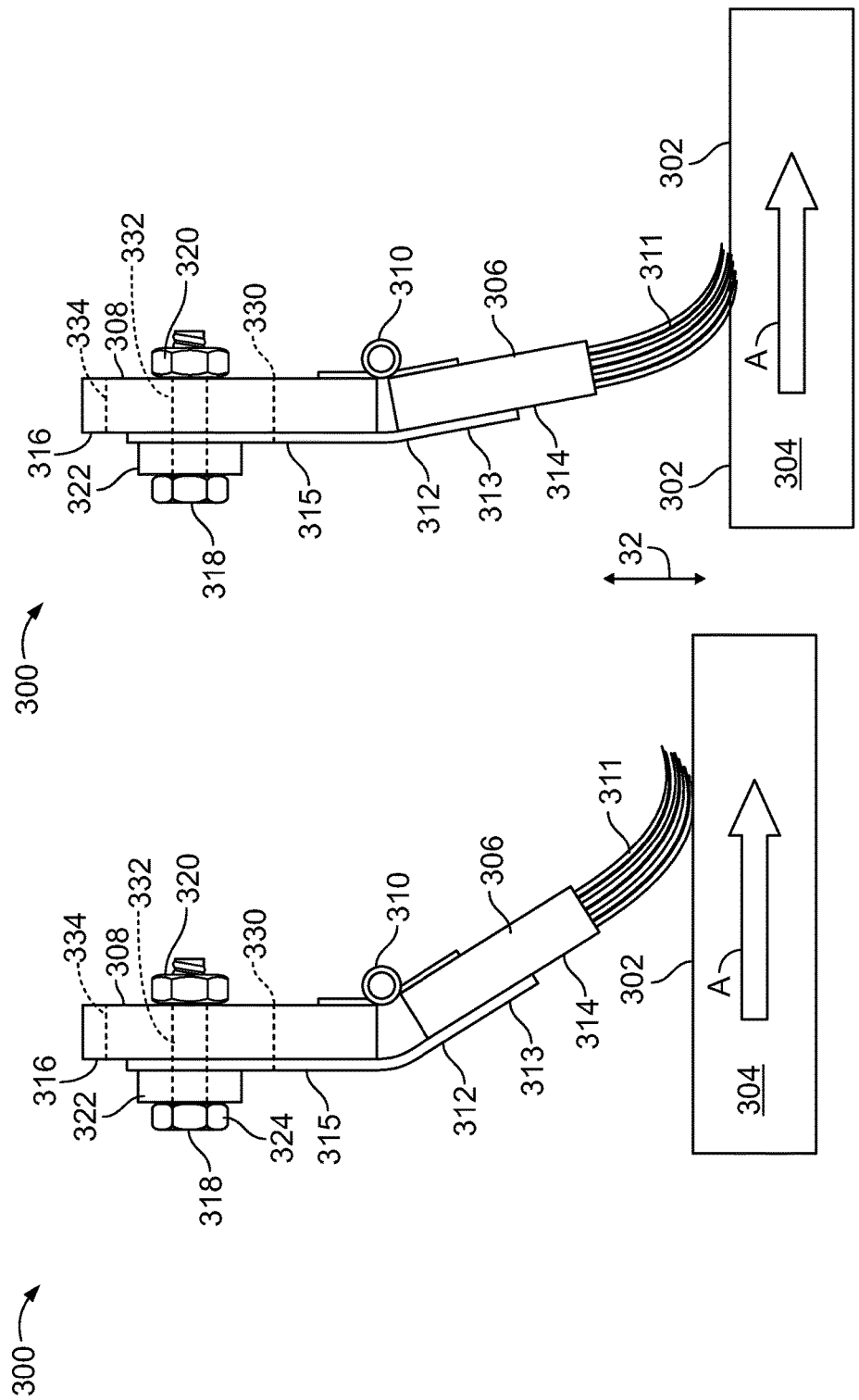
FIG. 19 illustrates an end view of a face seal engaging a face of a rotary wheel, according to an embodiment.
FIG. 20 illustrates an end view of a face seal engaging a face of a rotary wheel, according to an embodiment.

FIG. 19 illustrates an end view of a face seal 300 engaging a face 302 of a rotary wheel 304, according to an embodiment. The face seal 300 includes a seal holder 306 attached to a bracket 308 through a hinge 310. The seal holder 306 has a seal member 311 extending therefrom. The seal member 311 may be any of the seal members discussed above. Instead of a coil compression or rotary spring, however, an elastic strap 312, sheet, plate, or the like connects to the bracket 308 and the seal holder 306. The elastic strap 312 may be formed of rubber, for example. As shown in FIG. 19, the elastic strap 312 may connect to the bracket 308 and the seal holder 306 on an opposite side from the hinge 310.

A holder end 313 of the elastic strap 312 may be secured to the leading face 314 of the seal holder 306 through fasteners, bonding, adhesives, or the like. A bracket end 315 of the elastic strap 312 may be secured to a leading face 316 through a bolt 318 and nut 320. A tensioning plate 322 may be disposed between the bolt head 324 and the leading face 316 of the bracket 308. The resistive force of the elastic strap 312 may be adjusted by way of the bolt 318 and tensioning plate 322. For example, for increased tension, the bolt 318 may be tightened and/or the tension plate 322 may be removed and a thicker tension plate may be used. To decrease the tension, the bolt 318 may be loosened, and/or a thinner tension plate 322 may be used. Optionally, the bracket 308 includes fastener through holes 330, 332, and 334 at different levels. The elastic strap 312, the bolt 318, the nut 320, and the tension plate 322 may be changed to different levels based on the through holes 330, 332, and 334 (which may be connected through slots, so that bolt 318 may be moved therebetween) to vary the resistive force of the elastic strap 312 exerted into the seal holder 306. More or less through holes may be formed in the bracket 308.

In operation, as the wheel 304 rotates in the direction of arrow A, the elastic strap 312 exerts a force in the opposite direction to resist the rotation. That is, the elastic strap 312 pulls the seal holder in the opposite direction of arrow A. The resistive force of the elastic strap 312 ensures that the seal member 311 remains in sealing contact with the face 302 of the wheel 304.

FIG. 20 illustrates an end view of the face seal 300 engaging the face 302 of the rotary wheel 304. As shown in FIGS. 19 and 20, even when the distance between the wheel 304 and the bracket 308 changes, the resistive force of the elastic strap 312 ensures that the seal member 311 maintains a sealing contact with the face 302 of the wheel 304. As shown in FIG. 20, the elastic strap 312 forces the seal holder 306 into a more upright position when the wheel 304 is further away from the bracket 308.

Accordingly, the face seal 300 provides an adaptable, self-adjusting, reliable and durable seal. Additionally, the seal configuration shown in FIGS. 19 and 20 may be used with respect to a circumferential seal assembly, in a similar manner as shown and described with respect to FIG. 14.

Figure 21:
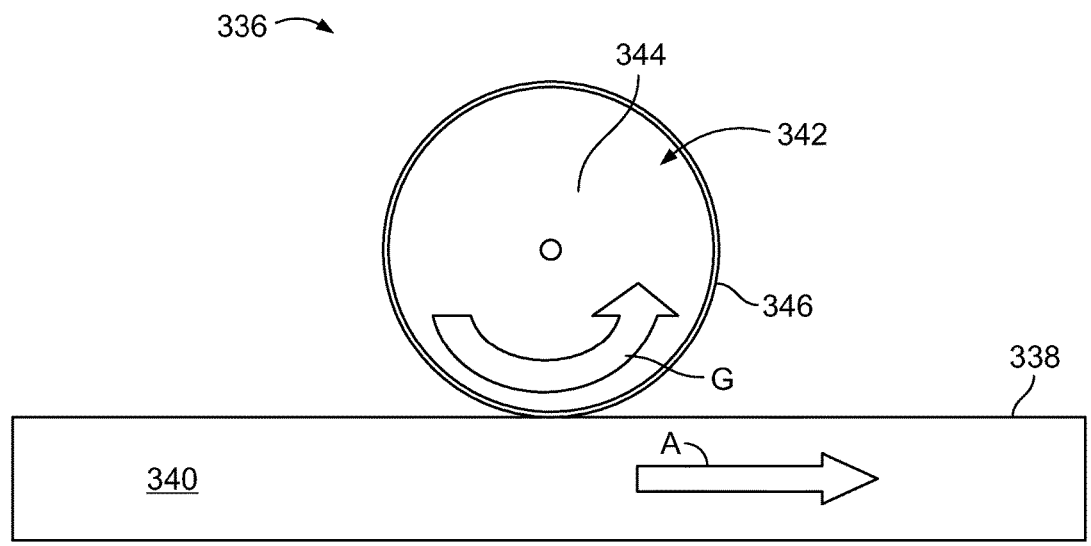
FIG. 21 illustrates an end view of a rolling face seal engaging a face of a rotary wheel, according to an embodiment.

FIG. 21 illustrates an end view of a rolling face seal 336 engaging a face 338 of a rotary wheel 340, according to an embodiment. The face seal 336 includes a cylindrical roller 342 rotatably secured to a bracket (such as the bracket 42 shown in FIG. 2). The roller 342 includes a main body 344 and a circumferential low-friction outer layer 346. Optionally, the outer layer 346 may be omitted if the roller 342 is formed of a low-friction material. The main body 344 may be formed of rubber, plastic, or the like. The roller 342 may be formed of a material such as, but not limited to, silicone, neoprene, buna-n rubber, polyurethane, ethylene propylene diene monomer (EPDM) rubber, thermoplastic vulcanizates (TPV) rubber, thermoplastic elastomers (TPE), terafluoro-ethylene-propylene rubber, vinyl rubber, butyl rubber, epichlolohydrin (ECH) rubber, fluorosilicone rubber, gum rubber, latex rubber, Teflon, UHMW polyethylene, and/or polypropylene. The low-friction outer layer 346 may be formed of a material including, but not limited to, Teflon, UHMW polyethylene, polypropylene, acetal, nylon, or the like. In at least one embodiment, the roller 342 may drive rotation of the wheel 340. That is, the roller 342 may be operatively connected to a motor that causes the roller 342 to rotate about its longitudinal axis. The rotation of the roller 342 may, in turn, drive rotation of the wheel 340 that contacts the roller 342.

In operation, as the wheel 340 rotates in the direction of arrow A, the face seal 336 rotates in response in the direction of arc G. The rotation direction A is generally tangent to the rotation direction G at the point where the face seal 336 contacts the face 338 of the wheel 340. As the wheel 340 rotates, the face seal 336 provides a rolling, sealing engagement with the face 338, thereby significantly reducing the friction compared to traditional contact seals that slide along the surface of a wheel.

Figures 22, 23:
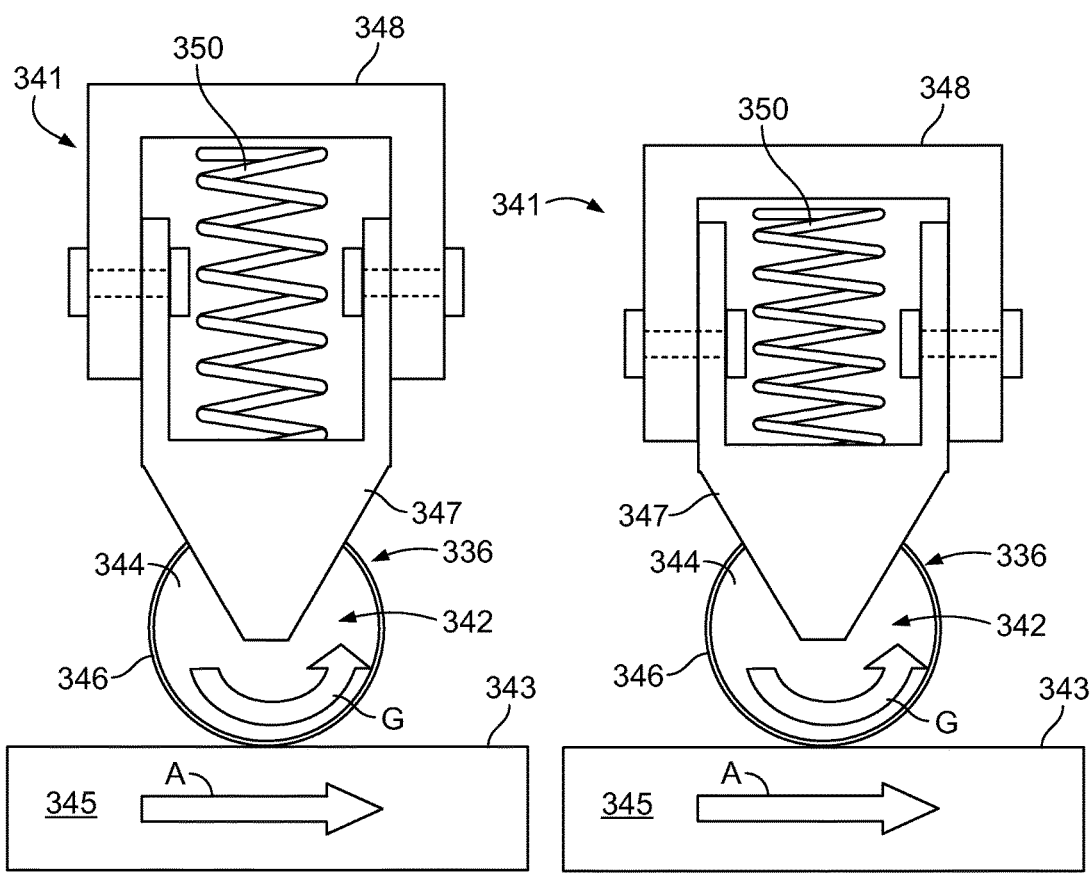
FIG. 22 illustrates an end view of a face seal assembly engaging a face of a rotary wheel, according to an embodiment.
FIG. 23 illustrates an end view of a face seal assembly engaging a face of a rotary wheel, according to an embodiment.

FIG. 22 illustrates an end view of a face seal assembly 341 engaging a face 343 of a rotary wheel 345, according to an embodiment. The face seal assembly 341 includes the rolling face seal 336 described above with respect to FIG. 21. However, the rolling face seal 336 is rotatably connected to a seal bracket 347 that is movably connected to a main housing 348. A spring member 350 is enclosed by the main housing 348 and the seal bracket 347. The rolling seal 336 engages the face 343 of the wheel 345 as described above with respect to FIG. 21. The spring member 350 exerts a resistive force into the seal bracket 347 and ensures that the rolling face seal 336 maintains constant contact with the face 343 in a similar manner as described above with respect to FIGS. 10 and 11.

FIG. 23 illustrates an end view of the face seal assembly 341 engaging the face 343 of the rotary wheel 345. As shown in FIGS. 22 and 23, even when the distance between the wheel 345 and the rolling face seal 336 changes, the resistive force exerted by the spring member 350 ensures that the rolling face seal 336 remains in contact with the face 343.

Accordingly, the face seal assembly 341 provides an adaptable, self-adjusting, reliable and durable seal.

Figure 24:
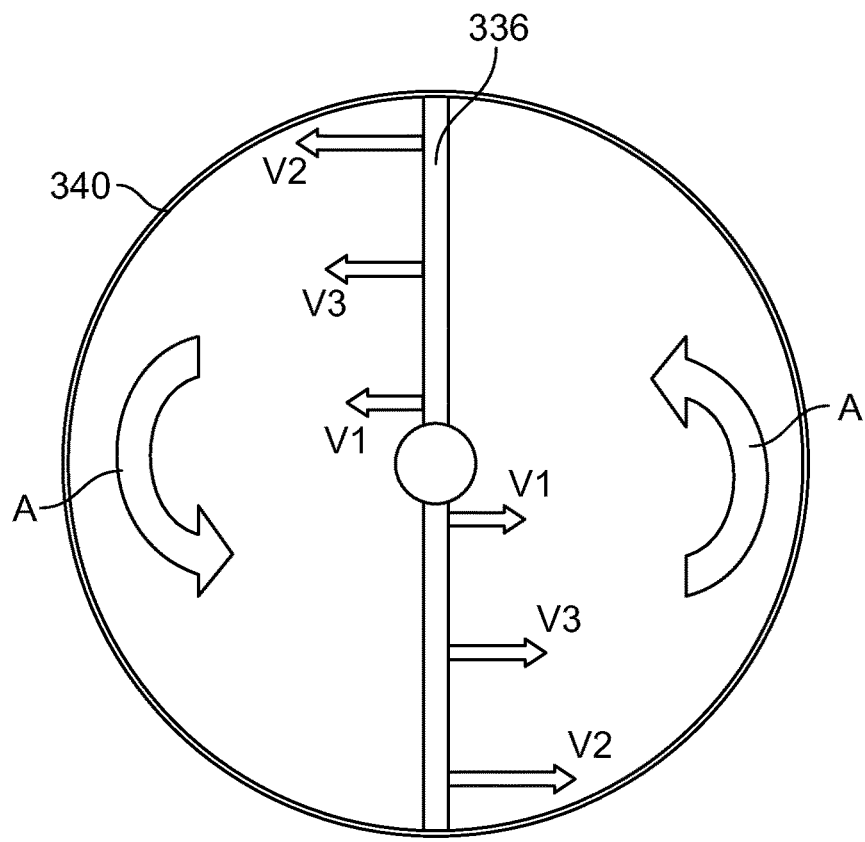
FIG. 24 illustrates a front view of a rotary wheel, according to an embodiment.

FIG. 24 illustrates a front view of the rotary wheel 340, according to an embodiment. As shown, the cylindrical rolling face seal 336 bisects the wheel 340. The radial velocity V1 of the wheel 340 proximate a center is less than a radial velocity V2 of the wheel 340 proximate a circumferential edge. As such, a single cylindrical rolling face seal 336 would generally rotate at a velocity that corresponds to the average velocity V3 of the wheel 340. However, the single cylindrical rolling face seal 336 would then most likely slip at other portions of the wheel 340 that are not rotating at the average velocity V3.

Figure 25:
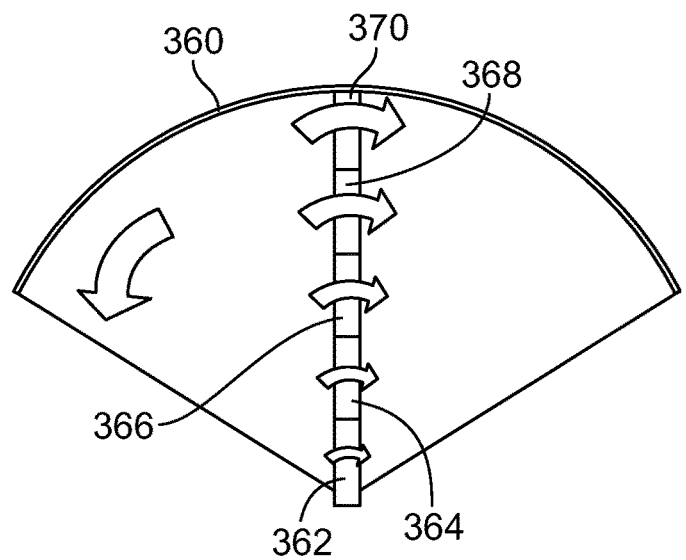
FIG. 25 illustrates a front view of a portion of a rotary wheel, according to an embodiment.

FIG. 25 illustrates a front view of a portion of a rotary wheel 360, according to an embodiment. In this embodiment, instead of using a single cylindrical rolling seal, a plurality of separate, distinct, and aligned rolling seal segments 362, 364, 366, 368, and 370 are used. In this manner, the innermost segment 362 will rotate at a first velocity that corresponds to the slower speed of the wheel 360 near the center, while the outermost segment 362 will rotate at a second velocity that corresponds to the faster speed of the wheel 360 near the circumferential edge. Thus, the segments 362, 364, 366, 368, and 370 all rotate at different speeds depending on the radial distance from the center of the wheel 360. Accordingly, the segments 362, 364, 366, 368, and 370 are less susceptible to slipping, as compared to a single cylindrical roller.

The segments 362, 364, 366, 368, and 370 may be connected to one another through a sealing agent, such as rubber, or the like. In order to minimize seams between the segments, sealing members such as described above may be used at segment joints. Alternatively, each segment may include male and female ends, with the female ends maintaining contact with the wheel, and a male end of an adjacent segment fitting within the female end. The male end may rotate freely within the female end. More or less segments than those shown in FIG. 25 may be used. Other than segmentation, the rolling seals segments 362, 364, 366, 368, and 370 are generally the same as the rolling face seal 336 shown and described with respect to FIGS. 21-23.

Figure 26:
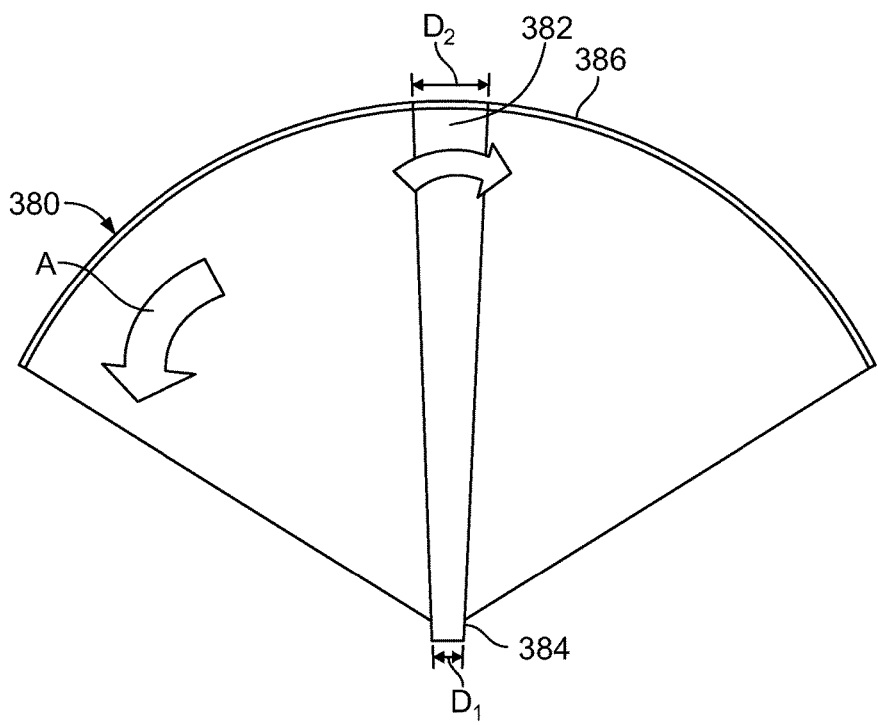
FIG. 26 illustrates a front view of a portion of a rotary wheel, according to an embodiment.

FIG. 26 illustrates a front view of a portion of a rotary wheel 380, according to an embodiment. In this embodiment, a rolling face seal 382 has a first diameter D1 near the center 384 of the wheel 380, and a second diameter D2 proximate a circumferential edge 386 of the wheel 380. The second diameter D2 exceeds the first diameter D1. The diameter of the rolling face seal 382 generally tapers down from the circumferential edge 386 to the center 384 of the wheel 380. The tapered nature of the rolling face seal 382 reduces the amount of friction due to the velocity difference between the outer rim and the center of the wheel 380. That is, the surface velocity of the rolling face seal is generally constant at all points, which minimizes any sliding of the roller. Other than the tapered nature, the rolling face seal 382 is generally the same as the rolling face seal 320 shown and described with respect to FIGS. 21-23.

Figure 27:
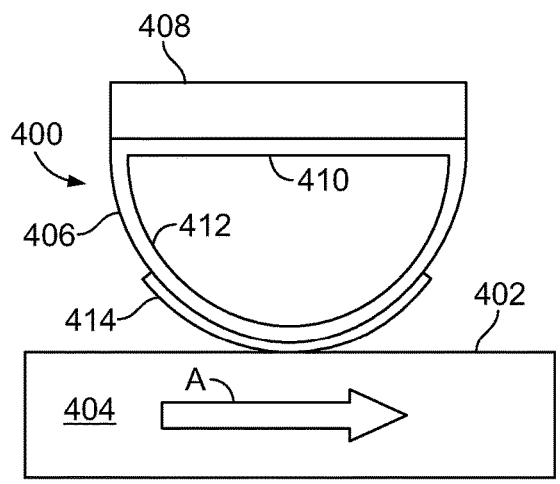
FIG. 27 illustrates an end view of a face seal engaging a face of a rotary wheel, according to an embodiment.

FIG. 27 illustrates an end view of a face seal 400 engaging a face 402 of a rotary wheel 404, according to an embodiment. The face seal 400 includes an enclosed beam 406, tube, column, sleeve, or the like secured to a bracket 408 of a rotary wheel (such as the bracket 42 shown in FIG. 1). Optionally, the beam 406 may connect to a seal holder that connects to the bracket 408. The beam 406 may be formed of an elastic material, such as rubber or a similar material, and may be hollow or solid. For example, the beam 406 may be formed of a material, such as, but not limited to, ethylene propylene diene monomer (EPDM) rubber, thermoplastic vulcanizates (TPV) rubber, thermoplastic elastomers (TPE), silicone, neoprene, polyurethane, buna-n rubber, tetrafluoroethylene-propylene rubber, vinyl rubber, butyl rubber, epiclorohydrin (ECH) rubber, fluorosilicone rubber, and the like. The beam 406 includes a D-shaped cross-section with a straight base 410 secured to the bracket 406, and an outwardly-extending semi-circular wall 412 that extends toward the wheel 404. Optionally, the beam 406 may have various-other shaped cross-sections, such as a P-shaped or O-shaped cross section. The face seal 400 also includes a wear strip 414 that is secured to an outer surface of a portion of the semi-circular wall 412. Optionally, the wear strip 414 may cover the entire outer surface of the wall 412. The wear strip 414 contacts the face 402 of the wheel 404. The wear strip 414 may be formed of a slippery, low-friction material, such as noted above. Optionally, the wear strip 414 may be omitted, if the semi-circular wall 412 if formed of a material that is flexible and resistant to wear.

Figure 28:
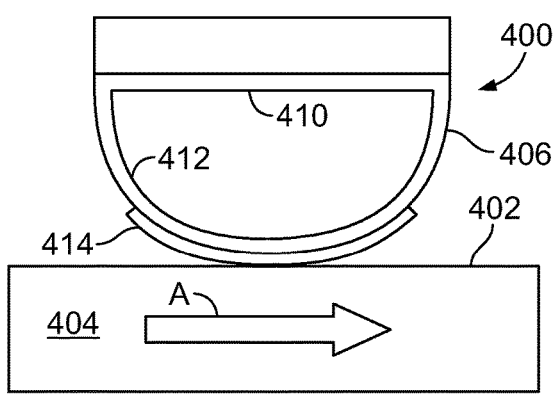
FIG. 28 illustrates an end view of a face seal engaging a face of a rotary wheel, according to an embodiment.

FIG. 28 illustrates an end view of the face seal 400 engaging the face 402 of the rotary wheel 404. Because the beam 406 is formed of an elastic material, the beam 406 is able to flex and maintain pressure with the face 402 of the wheel 404. Indeed, it has been found that the D-shaped profile allows for increased sealing engagement with the face 402 of the wheel. Moreover, the wear strip 414 ensures that the face seal 400 does not snag or otherwise damage the wheel 404, while at the same time protecting the rubber beam 404 from wearing down. As shown in FIG. 28, the D-shaped profile of the beam 406 elastically compresses when the wheel 404 comes closer to the face seal 400. However, because of its elastic nature, the beam 406 rebounds to its original shape when the wheel 404 moves away from the face seal 400, as shown in FIG. 27. In this manner, the face seal 400 provides constant sealing engagement with the face 402 of the wheel 404.

Unlike a balloon seal, the face seal 400 does not rely on air pressure to provide a sealing engagement force. Instead, the face seal 400 relies on the elastic properties of the beam 406 to provide the sealing force. The wear strip 414 provides a low friction surface that reduces the amount of power used to turn the wheel 404, and also prevents wear to both the wheel 404 and the beam 406. The D-shaped face seal 400 also withstands high pressure differentials on either side thereof, unlike a conventional contact seal. Further, unlike traditional bulb-seals, the D-shaped face seal 400 does not wear rapidly over time.

Accordingly, the face seal 400 provides an adaptable, self-adjusting, reliable and durable seal. Additionally, the seal configuration shown in FIGS. 27 and 28 may be used with respect to a circumferential seal assembly, in a similar manner as shown and described with respect to FIG. 9.

Figures 29, 30:
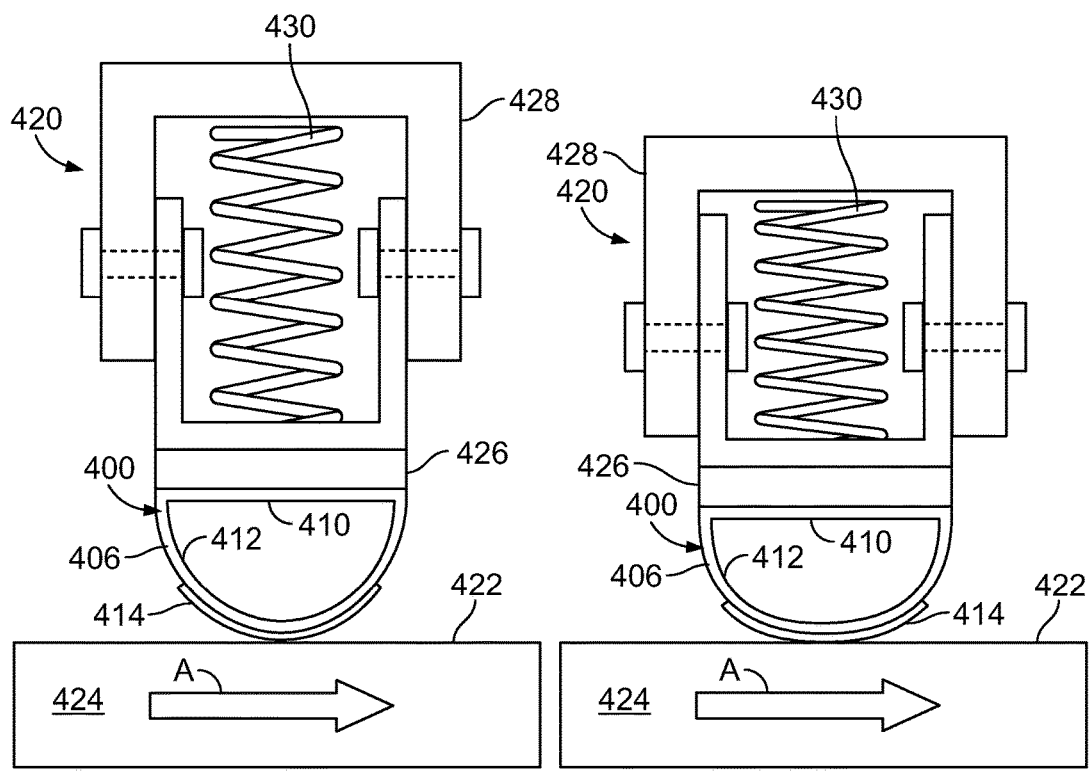
FIG. 29 illustrates an end view of a face seal assembly engaging a face of a rotary wheel, according to an embodiment.
FIG. 30 illustrates an end view of a face seal assembly engaging a face of a rotary wheel, according to an embodiment.

FIG. 29 illustrates an end view of a face seal assembly 420 engaging a face 422 of a rotary wheel 424, according to an embodiment. The face seal assembly 420 includes the D-shaped face seal 400 described above with respect to FIGS. 27 and 28. However, the D-shaped face seal 400 connects to a seal bracket 426 that is movably connected to a main housing 428. A spring member 430 is enclosed by the main housing 428 and the seal bracket 426. The D-shaped face seal 400 engages the face 422 of the wheel 424 as described above with respect to FIGS. 28 and 29. The spring member 430 exerts a resistive force into the seal bracket 426 and ensures that the D-shaped face seal 400 maintains constant contact with the face 422 in a similar manner as described above with respect to FIGS. 10 and 11.

FIG. 30 illustrates an end view of the face seal assembly 420 engaging the face 422 of the rotary wheel 424. As shown in FIGS. 29 and 30, even when the distance between the wheel 424 and the D-shaped face seal 400 changes, the resistive force exerted by the spring member 430 ensures that the D-shaped face seal 400 remains in contact with the face 422.

Accordingly, the face seal assembly 420 provides an adaptable, self-adjusting, reliable and durable seal. Additionally, the seal configuration shown in FIGS. 29 and 30 may be used with respect to a circumferential seal assembly, in a similar manner as shown and described with respect to FIG. 14.

Figures 31, 32:
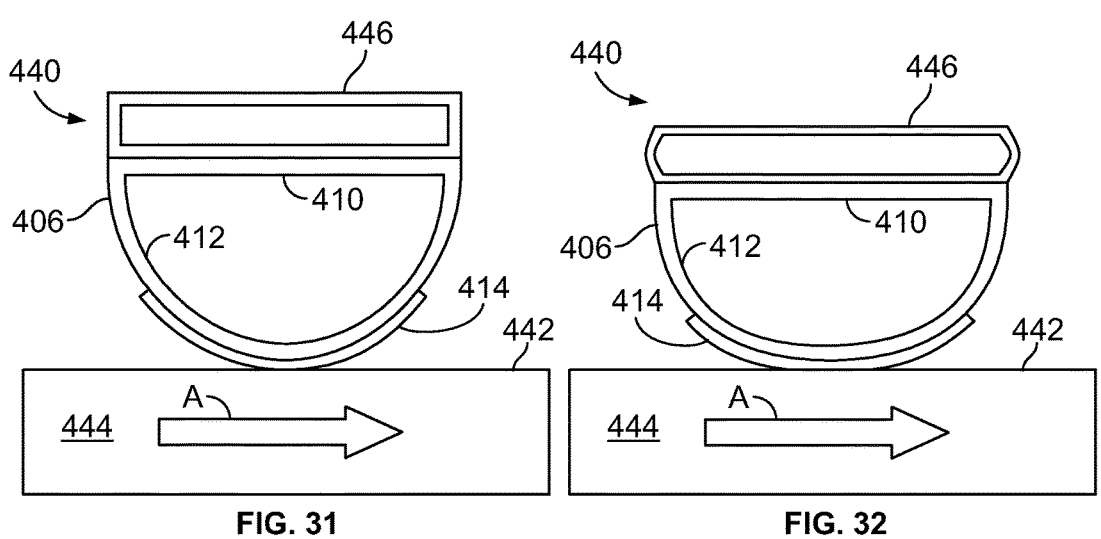
FIG. 31 illustrates an end view of a face seal engaging a face of a rotary wheel, according to an embodiment.
FIG. 32 illustrates an end view of a face seal engaging a face of a rotary wheel, according to an embodiment.

FIG. 31 illustrates an end view of a face seal 440 engaging a face 442 of a rotary wheel 444, according to an embodiment. In this embodiment, the D-shaped beam 406 is secured to an elastic bracket 446 that may be connected to a support bracket of a rotary wheel (such as the bracket 42 shown in FIG. 2). The elastic bracket 336 may be formed of rubber, or various other elastic materials, as noted above. The D-shaped beam 406 may be connected to the elastic bracket 446 by either bonding, or through co-extrusion. The elastic bracket 446 may be made in a variety of shapes, and may be formed of the same material as the D-shaped beam 406, or a different elastic material to provide different levels of stiffness.

Optionally, the D-shape of any of the embodiments may be other shapes, such as a rectangle, for example. Moreover, the beams may be hollow, solid (such as being formed of rubber or foam), or filled with an elastic material (such as foam or gel).

FIG. 32 illustrates an end view of the face seal 420 engaging the face 422 of the rotary wheel 424. As shown in FIG. 32, the elastic bracket 446 compresses as the wheel 444 moves closer to the D-shaped beam 406, which also compresses. However, because both the D-shaped beam 406 and the bracket 446 are formed of an elastic material(s), both rebound toward their original shapes as the wheel 444 recedes, as shown in FIG. 31.

Accordingly, the face seal assembly 440 provides an adaptable, self-adjusting, reliable, and durable seal. Additionally, the seal configuration shown in FIGS. 31 and 32 may be used with respect to a circumferential seal assembly, in a similar manner as shown and described with respect to FIG. 14. Also, the face seal 420 may be connected to a seal bracket and main housing that enclose a spring member, as shown in FIGS. 29 and 30.

Figure 33:
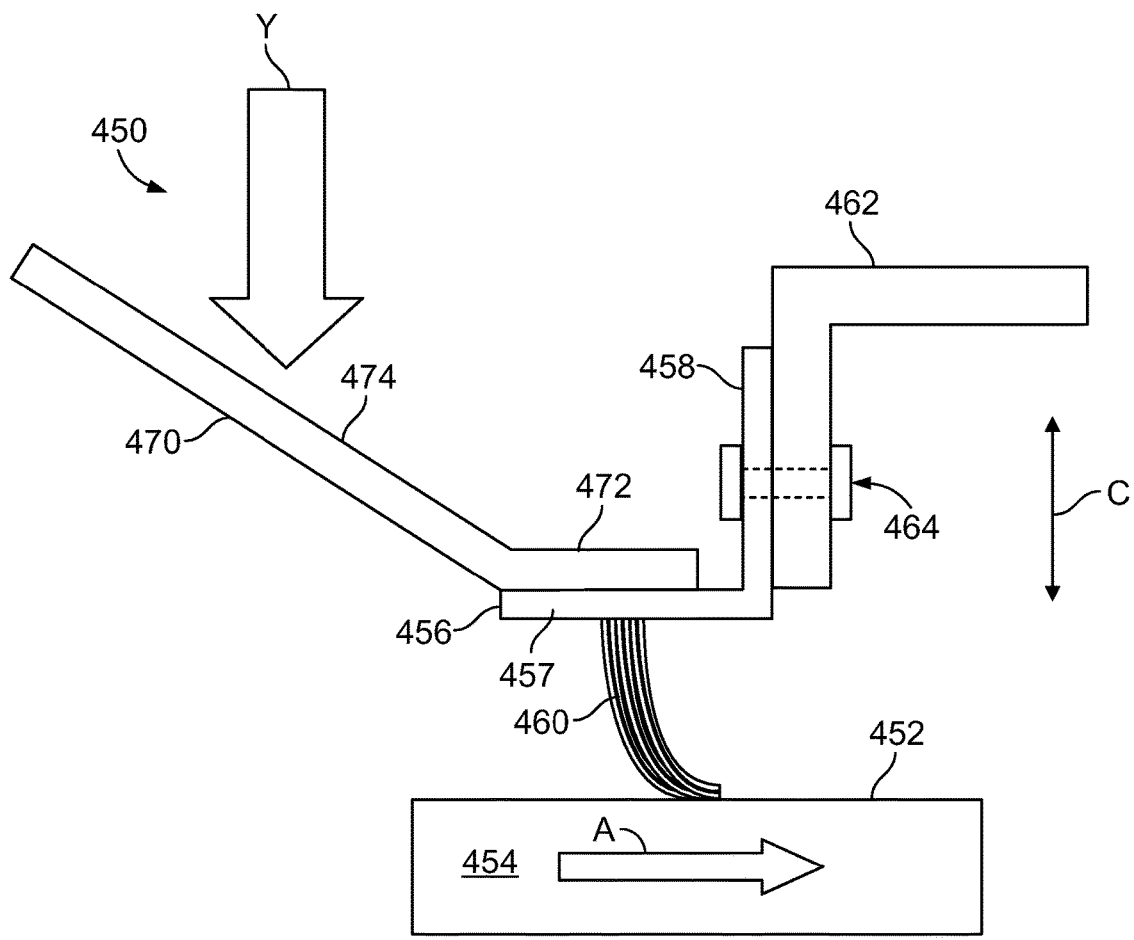
FIG. 33 illustrates an end view of a face seal assembly engaging a face of a rotary wheel, according to an embodiment.

FIG. 33 illustrates an end view of a face seal assembly 450 engaging a face 452 of a rotary wheel 454, according to an embodiment. The face seal assembly 450 includes a seal holder 456 having a planar beam 457 or panel that is generally parallel with the surface of the face 452. The planar beam 457 is integrally connected to a mounting beam 458 or panel that is generally perpendicular to the planar beam 457. A sealing member 460, such as a brush seal, or any of the seal member discussed above (such as, for example, a D-shaped face seal, rolling face seal, or the like), extends from the planar beam 457 toward the face 452 of the wheel 454.

The mounting beam 458 connects to a bracket 462, such as the bracket 42 (shown in FIG. 2). A fastener 464 connects the mounting beam 458 to the bracket 462. Similar to the embodiments shown in FIGS. 10 and 11, either the mounting beam 458 or the bracket 462 includes a through hole that receives the fastener 464, while the other includes an aligned slot that receives the fastener, but which allows the seal holder 456 to move relative to the bracket 462 in the directions of arrows C.

An air fin 470 is secured to the seal holder 456. As shown in FIG. 33, the air fin 470 includes a planar base 472 that mounts over the planar beam 457. The planar base 472 integrally connects to an angled fin 474, flat plate, or the like. The fin 474 or plate may include a plurality of fins or plates separated by gaps, or may be a contiguous piece of material. The fin 474 is configured to receive and/or collect air and force the seal holder 456 in the direction of arrow Y as air pressure builds on the air fin 470. That is, air pressure in the direction of arrow Y is used to ensure that the seal member 460 maintains sealing contact with the face 452 of the wheel 454.

Accordingly, the face seal assembly 450 provides an adaptable, self-adjusting, reliable and durable seal. Additionally, the seal configuration shown in FIG. 33 may be used with respect to a circumferential seal assembly, in a similar manner as shown and described with respect to FIG. 14.

Figure 34:
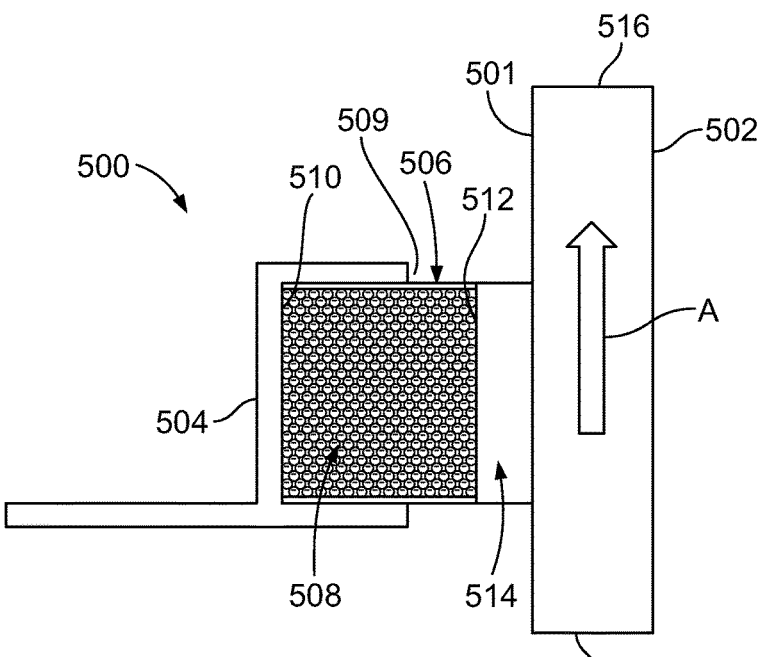
FIG. 34 illustrates an end view of a face seal assembly engaging a face of a rotary wheel, according to an embodiment.

FIG. 34 illustrates an end view of a seal assembly 500 engaging a face 501 of a rotary wheel 502, according to an embodiment. The seal assembly 500 may include a bracket 504 that securely retains a membrane 506 that contains foam 508. The membrane 506 includes a bracket end 510 secured within the bracket 504, and a strip end 512 secured to a wear strip 514, which may be a contiguous, planar sheet, or includes a plurality of wear strip segments. The bracket 504 may be formed of plastic or metal, such as aluminum, and have an open end 509 configured to receive and retain the bracket end 510 of the membrane 506.

The membrane 506 may include a cover, tube, encapsulating member, or the like configured to contain the foam 508. The membrane 506 may surround the foam 508 on all sides. Alternatively, portions of the foam 508 may extend through the membrane 506. For example, the strip end 512 may be open, thereby allowing the foam 508 to directly contact the wear strip 514. The bracket end 510 of the membrane 506 may be directly or indirectly bonded to the bracket 504, or secured thereto via adhesives, such as glue. The membrane 506 may be formed of rubber or other such materials that prevent air from escaping. Alternatively, the membrane 506 may simply include the foam 508 secured directly between the bracket 504 and the wear strip 514. As such, the membrane 506 may be a foam membrane.

The foam 508 may be an open cell foam, such as an open cell polyurethane foam. The foam 508 may be configured to be resilient and return to shape after being compressed, for example. Open cell polyurethane foam, for example is generally soft enough to ensure that the wear strip 514 does not excessively and quickly wear out, while also providing sufficient force into the wear strip 514 so that the wear strip 514 provides uniform and even contact with the face 501 of the wheel 502. Alternatively, various other types of foam may be used, such as closed cell foams.

The foam 508 within the membrane 506 urges the wear strip 514 into the face 501 of the wheel 502. The foam 508 is configured to force or otherwise urge the wear strip 514 into sealing engagement with the face 501 of the wheel 502.

A one-sided adhesive, sealing tape, such as Duraflex, may be applied between the foam 508 and/or the membrane 506 and the wear strip 512. The tape ensures that air does not escape from the membrane 506 and/or the foam 508.

Figure 35:
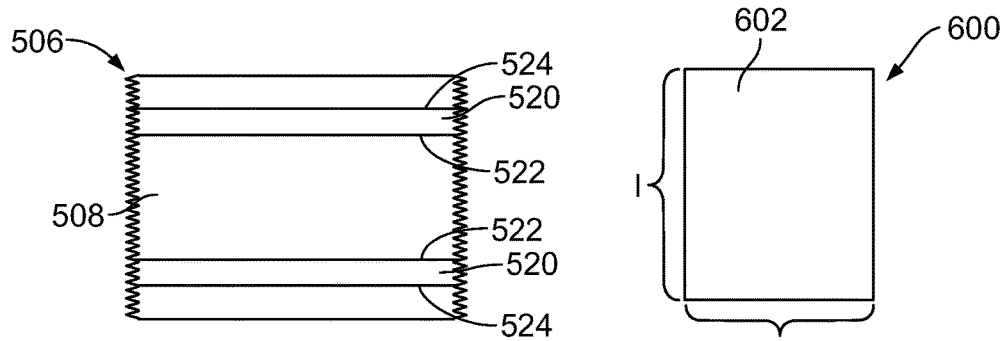
FIG. 35 illustrates a transverse cross-sectional view of a membrane, according to an embodiment.

FIG. 35 illustrates a transverse cross-sectional view of the membrane 506, according to an embodiment. The foam 508 may be contained within the membrane 506. A layer of tape 520 may be disposed between an outer surface 522 of the foam 508 and an inner surface 524 of the membrane 508. The tape 520 may be adhesively secured to one or both of the outer and inner surfaces 522 and 524, respectively. Alternatively, the membrane 506 may not include the tape 520.

Referring again to FIG. 34, the wear strip 514 may be secured to the strip end 512 of the membrane 506. In general, the wear strip 514 is used to increase the lifespan of the sealing interface, but may be omitted, such as when a sealing surface of the membrane 506 abuts into the wheel 502. The wear strip 514 may be secured to the strip end 512 through bonding, adhesives, or the like. The wear strip 512 may be formed of a slippery, low-friction material such as, but not limited to, Teflon, Ultra-High Molecular Weight (UHMW) polyethylene, polypropylene, acetal, and/or nylon.

The foam 508 forces the membrane 506 and/or the wear strip 514 into constant contact with the face 501 of the wheel 502. The membrane 506, filled with the foam 508, forces the wear strip 514 into the face 501 of the wheel 502 in a direction that is generally perpendicular to the circumferential direction of rotation of the wheel 502 denoted by arrow A. Because the wear strip 514 is formed of a non-stick material, such as noted above, the wear strip 514 does not snag, tear, or otherwise damage the wheel 502. The membrane 506 ensures that the wear strip 514 maintains contact with the face 501 regardless of differential pressures or surface deviations on the face 501. In addition to not damaging the face 501, the wear strip 514 is less susceptible to wearing down than rubber, for example.

The foam 508 and the membrane 506 may be sized and shaped to provide a flat, planar interface with the wear strip 514 at the strip end 512. For example, the foam 508 and the membrane 506 may be formed as square or rectangular blocks. Optionally, the foam 508 and the membrane 506 may include an extension beam connected to a flat, planar plate at the strip end 512. The flat, planar interface of the wear strip 514 provides uniform and even contact with the face 501 of the wheel 502, thereby preventing excessive wear at certain locations of the wear strip 514. Alternatively, the foam 508 and the membrane 506 may be sized and shaped differently. For example, the foam 508 and the membrane 506 may be sized and shaped as spheres, pyramids, or the like.

While the membrane 506 may be filled with the foam 508, various other materials may be used in addition to, or in lieu of, the foam 508. For example, the membrane 506 may be filled with liquid, gel, air, rubber, or various other materials in order to force the wear strip 514 into the face 501 of the wheel 502. Accordingly, the seal assembly 500 provides an adaptable, self-adjusting, reliable and durable seal.

Additionally, the seal configuration shown in FIG. 34 may be used with respect to a circumferential seal assembly. For example, the seal assembly 500 may be positioned and oriented such that the membrane 506 urges the wear strip 514 into sealing contact around a circumference 516 of the wheel 502.

Figure 36:
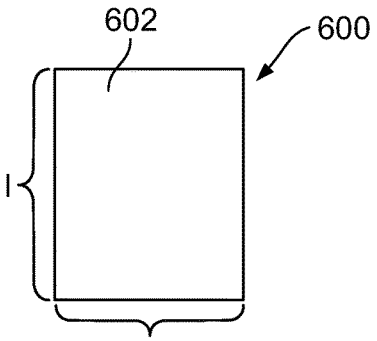
FIG. 36 illustrates a view of a wheel-engaging surface of a face seal assembly, according to an embodiment.

FIG. 36 illustrates a view of a wheel-engaging surface 600 of a face seal assembly, according to an embodiment. The wheel-engaging surface 600 is configured to directly contact a face of a rotary wheel, such as shown in FIG. 34. The wheel-engaging surface 600 may include a contiguous wear strip surface 602. As such, the wheel-engaging surface 600 may be a single, contiguous wear strip having an area (width (w)×length (l)) configured to directly contact the face of the rotary wheel.

Figure 37:
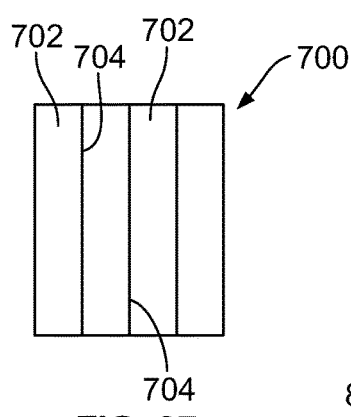
FIG. 37 illustrates a view of a wheel-engaging surface of a face seal assembly, according to an embodiment.

FIG. 37 illustrates a view of a wheel-engaging surface 700 of a face seal assembly, according to an embodiment. The wheel-engaging surface 700 may include a plurality of wear strip segments 702 separated by gaps 704. The wear strip segments 702 are configured to pivot and flex with respect to one another at the gaps 704 in order to allow the wheel-engaging surface 700 to adapt to surface irregularities of the rotary wheel. As shown in FIG. 37, the wear strip segments 702 may be aligned with the direction of rotation of the rotary wheel. More or less wear strip segments 702 than those shown may be used. The gaps 704 may filled with foam or other portions of the membrane, for example. Alternatively, the gaps 704 may simply be air spaces.

Figure 38:
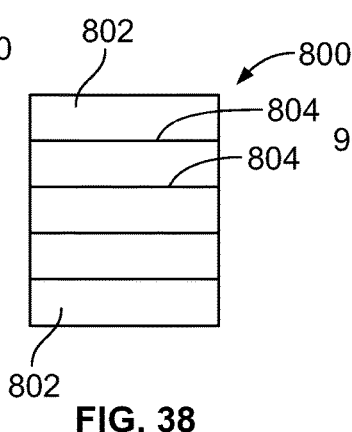
FIG. 38 illustrates a view of a wheel-engaging surface of a face seal assembly, according to an embodiment.

FIG. 38 illustrates a view of a wheel-engaging surface 800 of a face seal assembly, according to an embodiment. The wheel-engaging surface 800 may include a plurality of wear strip segments 802 separated by gaps 804. The wear strip segments 802 are configured to pivot and flex with respect to one another at the gaps 804 in order to allow the wheel-engaging surface 800 to adapt to surface irregularities of the rotary wheel. As shown in FIG. 38, the wear strip segments 802 may be perpendicular to the direction of rotation of the rotary wheel. More or less wear strip segments 802 than those shown may be used. The gaps 804 may be filled with foam or other portions of the membrane, for example. Alternatively, the gaps 804 may simply be air spaces.

Figure 39:
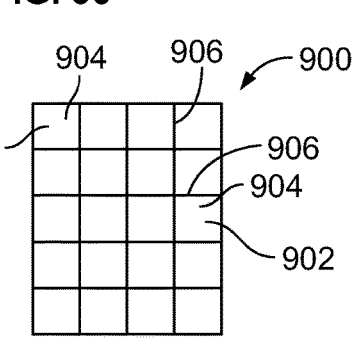
FIG. 39 illustrates a view of a wheel-engaging surface of a face seal assembly, according to an embodiment.

FIG. 39 illustrates a view of a wheel-engaging surface 900 of a face seal assembly, according to an embodiment. The wheel-engaging surface 900 may include a plurality of regularly-spaced wear strip segments 902 in the form of grid elements 904, separated by gaps 906. The grid elements 904 may be square, rectangular, hexagonal, octagonal, or various other shapes and sizes. The grid elements 904 may each be of equal size and shape. Alternatively, the grid elements 904 may be irregularly sized and shaped. The gaps 906 may be filled with foam or other portions of the membrane, for example. Alternatively, the gaps 906 may simply be air spaces.

Figure 40:
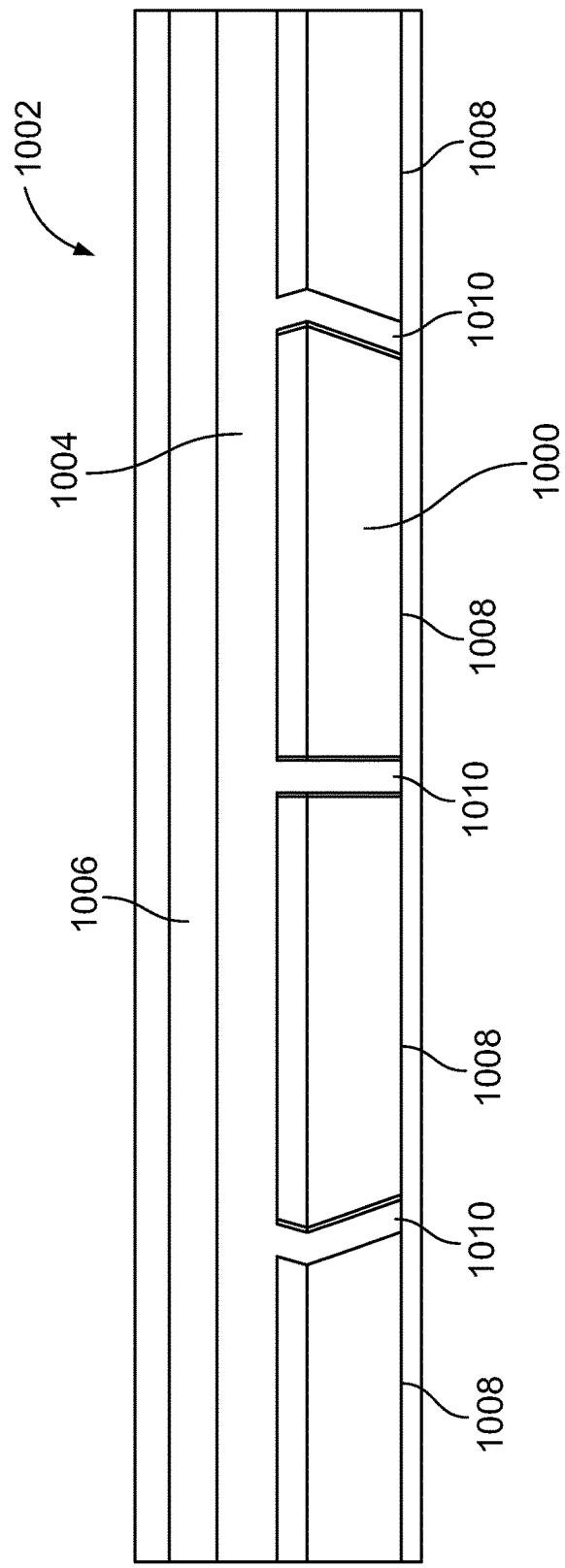
FIG. 40 illustrates an isometric view of a wheel-engaging surface of a face seal assembly, according to an embodiment.

FIG. 40 illustrates an isometric view of a wheel-engaging surface 1000 of a face seal assembly 1002, according to an embodiment. The face seal assembly 1002 may include a membrane 1004 containing foam 1006, for example. A plurality of wear strip segments 1008 may be secured to the membrane 1004 opposite the foam 1006. The membrane 1004 may occupy gaps 1010 between the wear strip segments 1008. The wear strip segments 1008 may be any of those described with respect FIGS. 37-39, for example. As such, the face seal assembly 1002 may include a wear strip having one or more wear strip segments. Instead of foam, the membrane 1004 may be inflated with air, filled with liquid, or the like, as described above.

Thus, embodiments provide adaptable, self-adjusting, reliable, and durable seals that are configured to continually adjust to maintain sealing engagement with a face and/or a circumferential edge of a rotary wheel. Embodiments automatically adjust a seal member to maintain contact with a surface of a wheel, whether that be a face or circumferential edge of the wheel. Embodiments provide seal assemblies that maintain sealing engagement with a surface of a wheel despite pressure differential changes and deviations in wheel surface or wobble. Embodiments provide seal assemblies that compensate for: seal wear, changes in wheel speed, changing temperature and/or humidity, frost or condensation on the wheel, the presence of contaminants and/or debris. It has been found that embodiments provide seal assemblies that provide a <1.05 OACF when exposed a 3 in. w.g. or higher pressure differential through the lifespan of a rotary wheel. Alternatively, it has been found that embodiments provide seal assemblies that provide a <1.08 OACF when exposed to a 5 in. w.g. or higher pressure differential with minimal OACF degradation. That is, embodiments provide seal assemblies that provide consistent and efficient sealing engagement that do not degrade over time.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A self-adjusting seal assembly configured to maintain sealing engagement with respect to a surface of a rotary wheel configured to be positioned within a supply air stream and an exhaust air stream, the self-adjusting seal assembly comprising:
   a bracket;
   a foam element positioned in the bracket such that a portion of the foam element extends from the bracket, the foam element having an exterior surface transverse to the surface of the rotary wheel;
   a membrane including a strip end and a bracket end, the bracket end being secured within the bracket; and
   a wear strip secured to the strip end of the membrane such that the membrane extends along the exterior surface of the foam element to cover at least a portion of the exterior surface extending from the bracket to contain the foam element, wherein one or both of the membrane and the foam element are configured to urge the wear strip into sealing engagement with a surface of the wheel.

2. The self-adjusting seal assembly of claim 1, wherein the wear strip is formed of one or more of Teflon, Ultra-High Molecular Weight polyethylene, polypropylene, acetal, delrin, polyurethane, or nylon.

3. The self-adjusting seal assembly of claim 1, wherein the surface of the rotary wheel is a face of the rotary wheel.

4. The self-adjusting seal assembly of claim 1, wherein the surface of the rotary wheel is a circumferential edge of the rotary wheel.

5. The self-adjusting seal assembly of claim 1, wherein the membrane comprises one or more of Teflon, Ultra-High Molecular Weight polyethylene, polypropylene, acetal, or nylon.

6. The self-adjusting seal assembly of claim 1, wherein the foam element comprises open cell foam.

7. The self-adjusting seal assembly of claim 1, further comprising a layer of tape disposed between the outer surface of the foam element and an inner surface of the membrane.

8. The self-adjusting seal assembly of claim 1, wherein one or both of the foam element and the membrane are sized and shaped to provide a flat, planar interface with the wear strip.

9. The self-adjusting seal assembly of claim 1, wherein the wear strip comprises a plurality of wear strip segments.

10. The self-adjusting seal assembly of claim 1, wherein the wear strip comprises a plurality of grid elements.

11. A rotary wheel assembly configured for use with a system for conditioning air supplied to an enclosed structure, wherein the rotary wheel assembly is configured to be positioned within a supply air stream and an exhaust air stream, the assembly comprising:
   a cassette frame;
   a wheel rotatably secured within the cassette frame; and
   a self-adjusting seal subassembly configured to maintain sealing engagement with respect to a surface of the wheel, the self-adjusting seal subassembly comprising:
      a bracket,
      a foam element positioned in the bracket such that a portion of the foam element extends from the bracket, the foam element having an exterior surface transverse to the surface of the rotary wheel,
      a membrane including a strip end and a bracket end, the bracket end being secured within the bracket, and
      a wear strip secured to the strip end of the membrane such that the membrane extends along the exterior surface of the foam element to cover at least a portion of the exterior surface extending from the bracket to contain the foam element, wherein one or both of the membrane and the foam element urge the wear strip into sealing engagement with a surface of the wheel.

12. The assembly of claim 11, wherein the wear strip is formed of one or more of Teflon, Ultra-High Molecular Weight polyethylene, polypropylene, acetal, delrin, polyurethane, or nylon.

13. The assembly of claim 11, wherein the surface of the rotary wheel is a face of the rotary wheel.

14. The assembly of claim 11, wherein the surface of the rotary wheel is a circumferential edge of the rotary wheel.

15. The assembly of claim 11, wherein the membrane comprises one or more of Teflon, Ultra-High Molecular Weight polyethylene, polypropylene, acetal, or nylon.

16. The assembly of claim 11, wherein the foam element comprises open cell foam.

17. The assembly of claim 11, further comprising a layer of tape disposed between the outer surface of the foam element and an inner surface of the membrane.

18. The assembly of claim 11, wherein one or both of the foam element and the membrane are sized and shaped to provide a flat, planar interface with the wear strip.

19. The assembly of claim 11, wherein the wear strip comprises a plurality of wear strip segments.

20. The assembly of claim 11, wherein the wear strip comprises a plurality of grid elements.

* * * * *